US012788687B2

(12) United States Patent
Gilreath et al.

(10) Patent No.: US 12,788,687 B2
(45) Date of Patent: Nov. 10, 2026

(54) CONTAINER THAT INCLUDES AN IMPROVED DISPENSING MECHANISM

(71) Applicant: Evernorth Strategic Development, Inc., St. Louis, MO (US)

(72) Inventors: Lindsay N. Gilreath, Edwardsville, IL (US); Sarah E. Ham, Olivette, MO (US); Robert E. Hoffman, Linden, IN (US); Jamie Williams, Edwardsville, IL (US); Marian Wilson, Fair Lawn, NJ (US); David MacVittie, Washington, DC (US); Mahesh Mistry, Simi Valley, CA (US)

(73) Assignee: Evernorth Strategic Development, Inc., St. Louis, MO (US)

( * ) Notice: Subject to any disclaimer, the term of this patent is extended or adjusted under 35 U.S.C. 154(b) by 644 days.

(21) Appl. No.: 18/072,396

(22) Filed: Nov. 30, 2022

(65) Prior Publication Data

US 2023/0181425 A1 Jun. 15, 2023

Related U.S. Application Data

(60) Provisional application No. 63/334,997, filed on Apr. 26, 2022, provisional application No. 63/288,926, filed on Dec. 13, 2021.

(51) Int. Cl.
*A61J 7/00* (2006.01)
*A61J 1/03* (2023.01)

(52) U.S. Cl.
CPC ............... *A61J 7/0076* (2013.01); *A61J 1/03* (2013.01); *A61J 2200/70* (2013.01)

(58) Field of Classification Search
CPC ........ A61J 7/0076; A61J 1/03; A61J 2200/70; A61J 7/0418; A61J 7/0481; A61J 2200/30
See application file for complete search history.

(56) References Cited

U.S. PATENT DOCUMENTS 3,586,208 A * 6/1971 Hussey .............. B65D 83/0409 221/302
4,117,956 A * 10/1978 von Schuckmann ........................ B65D 83/0427 221/303

(Continued)

FOREIGN PATENT DOCUMENTS

HK 2220600-0001 10/2022

OTHER PUBLICATIONS

Small Pill Organizer Portable Pill Box for Purse, first available Mar. 4, 2021, amazon.com [online], [site visited Oct. 29, 2024], Available at URL:https://www.amazon.com/Organizer-Portable-Compartment-Supplements-Waterproof/dp/B08Y5FF7WQ/ (Year: 2021).

*Primary Examiner* — Michael Collins
(74) *Attorney, Agent, or Firm* — Dickinson Wright PLLC

(57) ABSTRACT

The present disclosure describes a medication container that includes a receptacle having an inner space for holding medications and a main housing coupled with the receptacle for retaining the medications in the inner space. The main housing can have an opening and a movable gate that can selectively open and close the opening. A singulator is located between the inner space of the receptacle and the opening and being shaped to only allow a single item, e.g., a medication item, to pass through the singulator to the opening at a time. The main housing may further have a generally funnel-shaped inner wall that extends a wide end adjacent the inner space of the receptacle to a narrow end adjacent the singulator for guiding the medications towards the singulator during a dispensing operation.

17 Claims, 15 Drawing Sheets

(56) References Cited

U.S. PATENT DOCUMENTS

| | | | | |
|---|---|---|---|---|
| 4,402,425 | A * | 9/1983 | von Schuckmann | B65D 83/0409 221/202 |
| 4,405,060 | A * | 9/1983 | Hsei | B65D 83/0409 221/178 |
| 6,561,377 | B1 * | 5/2003 | Pearson | G07F 11/1657 221/13 |
| 6,726,058 | B2 * | 4/2004 | Giraud | B65D 83/0409 221/267 |
| 6,948,634 | B2 * | 9/2005 | Evans | B65D 43/021 221/202 |
| 7,243,817 | B2 * | 7/2007 | Giraud | B65D 83/0409 221/265 |
| 8,727,180 | B2 * | 5/2014 | Zonana | A61J 7/0409 221/288 |
| 8,963,710 | B2 * | 2/2015 | Huang | A61J 1/03 340/309.16 |
| 9,445,969 | B2 * | 9/2016 | Huang | G01F 17/00 |
| 9,498,408 | B2 | 11/2016 | Craig | |
| 9,501,887 | B2 | 11/2016 | Berg | |
| 9,554,969 | B2 | 1/2017 | Lehmann | |
| 10,159,176 | B2 | 12/2018 | Baitinger | |
| 10,322,885 | B2 | 6/2019 | Thompson | |
| 10,329,098 | B2 | 6/2019 | Thompson | |
| 10,360,751 | B2 | 7/2019 | Berg | |
| D878,197 | S | 3/2020 | Griffin | |
| 10,750,663 | B2 | 8/2020 | Garner | |
| D896,519 | S | 9/2020 | Cooper | |
| 11,235,104 | B2 * | 2/2022 | Cowe | A61M 5/2033 |
| D966,698 | S | 10/2022 | Chen | |
| D977,706 | S | 2/2023 | Tidnam | |
| D989,384 | S | 6/2023 | Tidnam | |
| D990,765 | S | 6/2023 | Tidnam | |
| D1,011,726 | S | 1/2024 | Du | |
| D1,011,876 | S | 1/2024 | Bogdziewicz | |
| D1,045,375 | S | 10/2024 | Nishida | |
| D1,045,392 | S | 10/2024 | Tidwell | |
| 2010/0249997 | A1 | 9/2010 | Greyshock | |
| 2013/0161207 | A1 | 6/2013 | Luciano, Jr. | |
| 2013/0200033 | A1 * | 8/2013 | Zonana | B65D 83/0409 215/231 |
| 2014/0251850 | A1 * | 9/2014 | Huang | A61J 1/03 29/729 |

* cited by examiner

CONTAINER THAT INCLUDES AN IMPROVED DISPENSING MECHANISM

CROSS-REFERENCE TO RELATED APPLICATIONS

This application claims priority to U.S. Provisional Patent Application 63/288,926, filed on Dec. 13, 2021, and entitled "SMART PILL BOX," and U.S. Provisional Patent Application 63/334,997, filed on Apr. 26, 2022, and entitled "SMART PILL BOX," the contents of both applications are herein incorporated by reference.

FIELD

The subject disclosure is generally related to medication containers and, more particularly, to a main housing for a medication container to dispense individual items.

BACKGROUND

Medication compliance by patients is a known problem in the medical industry because patients often, either intentionally or accidentally, fail to follow a medication regimen prescribed by a medical provider. In some cases, as little as a single missed dose may require a patient to restart a medication regimen from the beginning. One known product which seeks to improve medication compliance, includes a plurality of packets, each of which contains only the medications that the user has to take at a certain time. In other words, the pills are divided, not by type, but by when they should be taken. However, there remains a continuing need for a product that is can improve medication compliance and which is both more convenient and less costly than other known solutions.

SUMMARY

The present disclosure describes a medication container that includes a receptacle having an inner space for holding medications and a main housing coupled with the receptacle for retaining the medications in the inner space. The main housing can have an opening and a movable gate that can selectively open and close the opening. A singulator is located between the inner space of the receptacle and the opening and being shaped to only allow a single item, e.g., a medication item, to pass through the singulator to the opening at a time. The main housing may further have a generally funnel-shaped inner wall that extends a wide end adjacent the inner space of the receptacle to a narrow end adjacent the singulator for guiding the medications towards the singulator during a dispensing operation.

In an example embodiment, the medication container can include an adapter that is received within the singulator to and which is configured to reduce a maximum size of medication that can pass through the singulator towards the opening of the main housing.

In an example embodiment, the singulator has a through-passage with a non-circular shape.

In an example embodiment, the the adapter has an outer periphery that generally matches the non-circular shape of the through-passage of the singulator so that that the adapter can only be inserted into the through-passage of the singulator in one orientation.

In an example embodiment, the gate has an upper portion that is disposed at least partially outside of a housing of the main housing and has a restrictor arm that is located fully within the housing spaced from the upper portion of the cap. The restrictor arm can be configured to extend into the singulator when the gate is in a closed position to prevent the movement of medications through the singulator when the gate is in the closed position.

In an example embodiment, the medication container can further include at least one medication sensor located in said main housing between said restrictor arm of said gate and said upper portion of said gate, the at least one medication sensor being configured to detect movement of the medications from the receptacle to the opening of the main housing.

In an example embodiment, the at least one medication sensor includes a light emitter and a light detector.

In an example embodiment, the medication can further include an adapter that is received within the singulator. The adapter can have a pair of apertures that are aligned with one another. The restrictor arm can extend into both of the apertures of the adapter when the gate is in the closed position.

In an example embodiment, the receptacle can have a pair of fingers that have tabs which can be received within openings in a housing of the main housing to lockingly engage the receptacle with the main housing and wherein the fingers can be deflected to disengage the receptacle from the main housing.

In an example embodiment, the main housing can be configured to detect the movement of the medications into and out of the receptacle through the opening and to transmit data related to this movement of the medications to an external device.

The present disclosure describes various embodiments to utilize the containers described herein and to make the containers described herein. A method of making a medication container can include inserting a singulator into a housing of a main housing, inserting a plurality of medications into an inner space of a receptacle, and releasably joining the main housing with the receptacle. The housing can include a funnel-shaped inner wall that extends from a wide end to a narrow end adjacent the singulator. The singulator can have a through-passage that is shaped to only allow a single medication to pass through the singulator at a time. The housing can have an opening on an opposite side of the singulator from the funnel-shaped inner wall.

In an example embodiment, the method further includes the step of joining a gate with the housing of the main housing The gate is mounted in the housing to be selectably movable between an open position whereby the medications can freely flow through the opening of the housing of the main housing into and out of the receptacle and a closed position whereby the medications are trapped inside of the receptacle.

In an example embodiment, the method further includes the step of moving the gate into the closed position, with the gate having a restrictor arm, and whereby the restrictor arm extends into and across the through-passage of the singulator.

In an example embodiment, the method includes the step of inserting an adapter into the through-passage of the singulator to reduce a maximum pill size that can pass through the singulator from the inner space of the receptacle to the opening of the housing of the main housing.

In an example embodiment, the method includes the step of inserting at least one medication sensor into the main housing. The at least one medication sensor is positioned and configured to detect the passage of the medications through the singulator between the receptacle and the opening.

In an example embodiment, the method includes the step of inserting a processor and a memory and a wireless module into the main housing so that the main housing can store and transmit data pertaining to the passage of medications through the singulator to an external device.

In an example embodiment, a medication container can comprise a receptacle having an inner space for holding pills and having a pair of deflectable fingers on opposite sides of the receptacle, each of the fingers having an outwardly extending tab, a main housing including a housing that is releasably engaged with the deflectable fingers, and a singulator positioned in the housing and having a non-circular through-passage that is sized and shaped to only pass a single pill through the singulator at a time. In an example embodiment, the housing has a funnel-shaped inner wall with a wide end adjacent the receptacle and a narrow end adjacent the singulator for guiding the pills to the singulator. The housing has an opening on an opposite side of the singulator from the receptacle. At least one medication sensor is positioned adjacent the singulator and configured to sense pills passing through the through-passage of the singulator both into and out of the receptacle. The container includes a processor in electrical communication with the at least one medication sensor and with a memory and with a wireless module. The processor ca be configured to process data pertaining to each passage of a pill through the through-passage and to transmit the data to an external device. A gate is included and can move between a closed position and an open position to selectively open and close the opening. The gate can rotate about an axis. In an example embodiment, the gate slides within a dispensing wall of the container.

In an example embodiment, the medication container can include an adapter that is received within the through-passage of the singulator to and which is configured to reduce a maximum size of medication that can pass through the singulator towards the opening of the main housing.

In an example embodiment, the adapter has an outer periphery that generally matches the non-circular shape of the through-passage of the singulator so that that the adapter can only be inserted into the through-passage of the singulator in one orientation.

In an example embodiment, the gate has an upper portion that is disposed at least partially outside of a housing of the main housing and has a restrictor arm that is located fully within the housing spaced from the upper portion of the cap. The restrictor arm can be configured to extend into the singulator when the gate is in a closed position to prevent the movement of medications through the singulator when the gate is in the closed position.

BRIEF DESCRIPTION OF THE DRAWINGS

These and other features and advantages of the present disclosure will be readily appreciated, as the same becomes better understood by reference to the following detailed description when considered in connection with the accompanying drawings wherein.

DESCRIPTION OF THE ENABLING EMBODIMENTS

Figure 1:
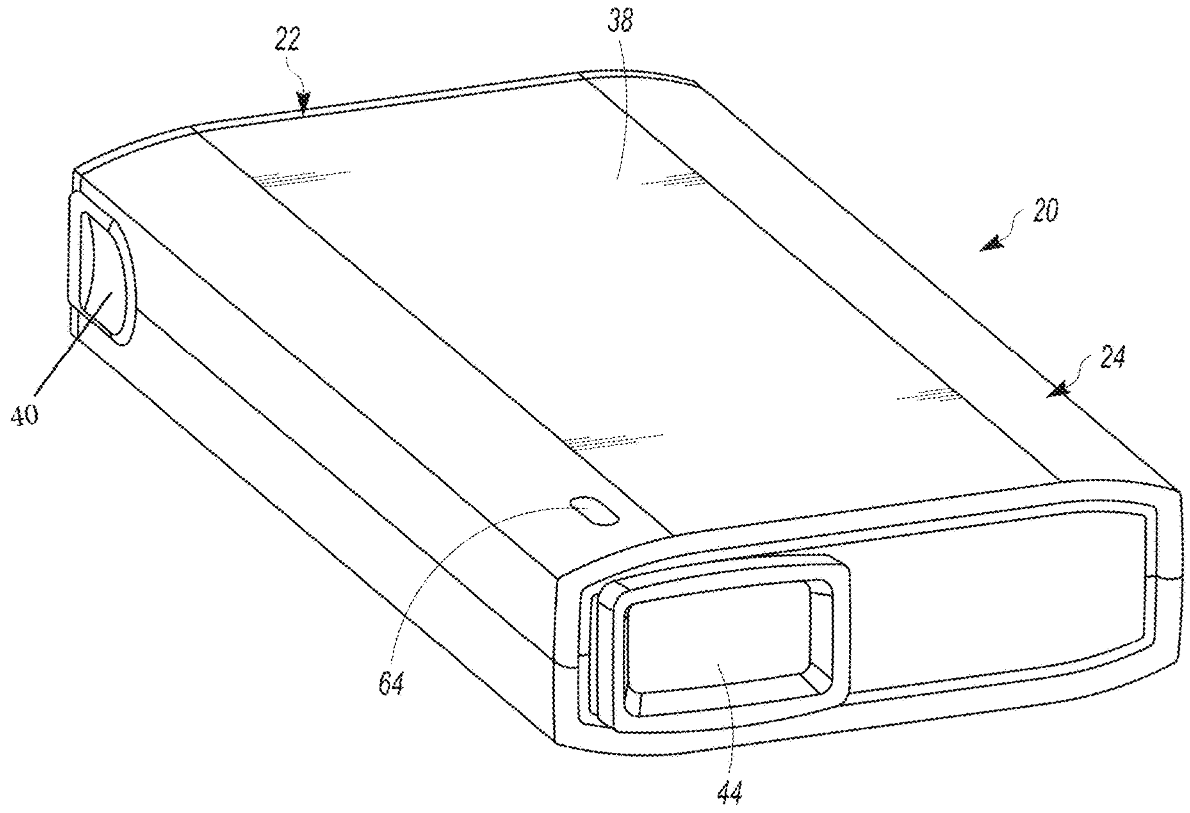
FIG. 1 is a perspective view of a first exemplary embodiment of a medication container.

Referring to the Figures, wherein like numerals identify corresponding parts throughout the several views, a medication container 20 with an improved dispensing mechanism is generally shown. As discussed in further detail below, the medication container 20 is a low-cost and highly effective approach to improving a user's compliance of a medication schedule. The medication container 20 includes a receptacle 22 and a main housing 24, which is a "smart device" in that it is configured both to monitor the passage of medications in the form of pills 26 out of the receptacle 22 and to transmit information pertaining to each dispensing event to at least one external device 28 (shown in FIG. 15), such as a computing device, e.g., a smart phone, a computer, a server or the like. The receptacle 22 is formed to hold the items therein, e.g., plurality of individual solid items, pills, capsules, tablets and the like. The housing 24 secures the items, houses the electronics, and provides a means to singulate the items, dispense the items and count the items being dispensed. The transmission of data relating to dispensing can be sent to the external device 28 either via a wired or wireless transmission means. The external device 28 may be controlled the patient, by a medical provider, a pharmacy, a pharmacy benefit provider, or combinations thereof. The external device 28 can include a display to display for its user an easy to access log of all dispensing events, including time stamps and quantities of pills 26 dispensed or graphics related to pills 26 dispensed from the receptacle 22. The graphics can be triggered by a flag value stored in a memory of the external device 28 or of an external database for the prescribed dosing regimen for the patient and the medication. Thus, the medication container 20 improves medication compliance (e.g., adherence) by helping the user avoid either missing medication doses, taking medication at the wrong time, or taking double doses of medication. In an embodiment where a medical provider is provided with access to the log of dispensing events, the medical provider may be able to better diagnose or otherwise treat a patient's illness with the full knowledge of how well that patient is conforming to their medication schedule. The use of the word pills 26 herein is intended to cover any suitable types of solid medications, including capsules, tablets, or the like.

Figure 2:
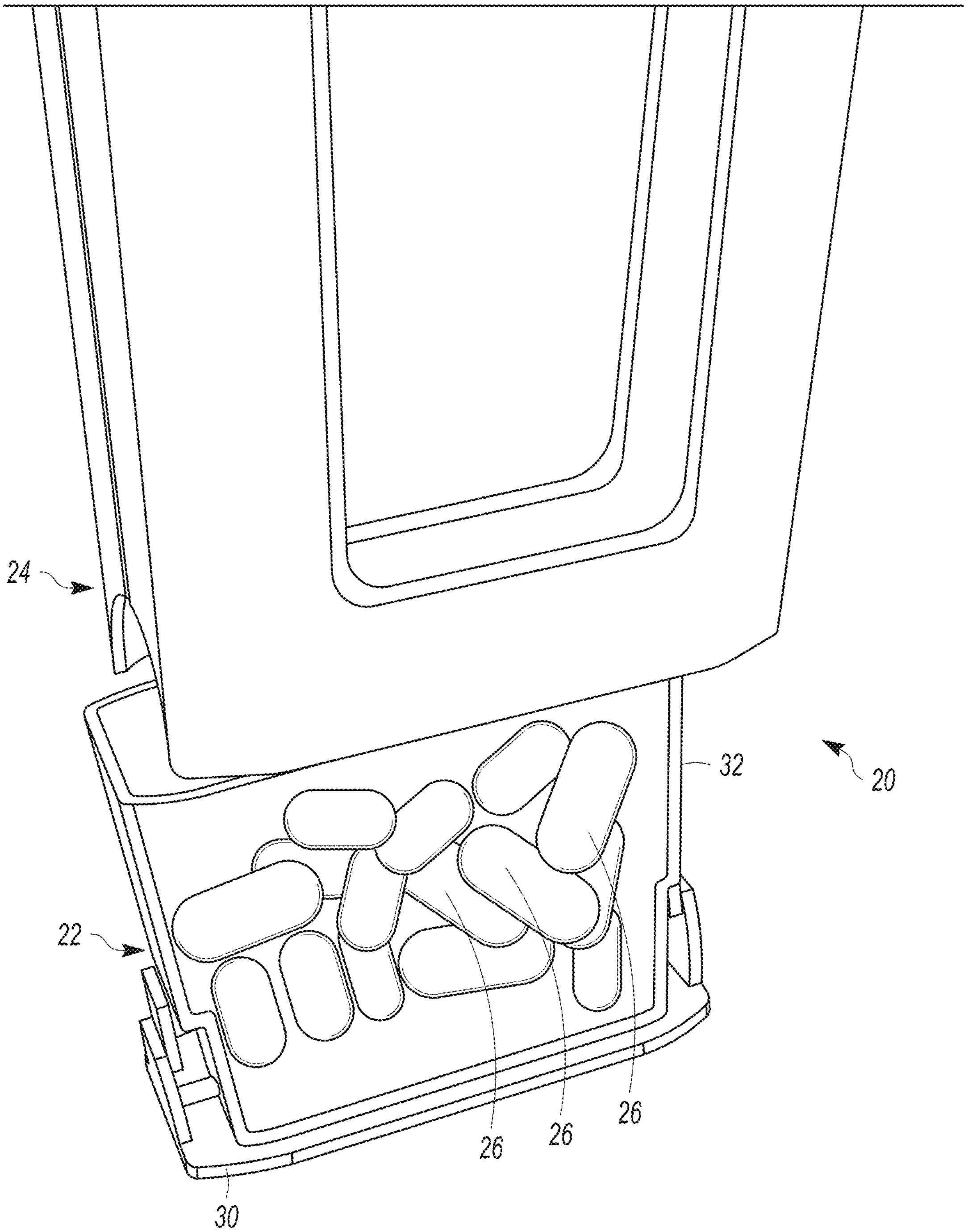
FIG. 2 is an exploded view of the medication container of FIG. 1.

As shown in FIG. 2, the receptacle 22 has a generally planar base piece 30 (sometimes referred to as the bottom) and a side wall piece 32, which has four side walls that extend upwardly from the base piece 30 to define a single inner space or storage void that extends from a closed end to an open end (sometimes referred to as the top). In the exemplary embodiment, the base piece 30 is generally rectangular in cross sectional shape and forms an open top parallelepiped. The side wall piece 32 include two generally parallel short walls and two generally parallel long walls. Also, in the exemplary embodiment, the base piece 30 is made as a separate piece than the side wall piece 30, and these two pieces are fixedly attached therewith. The base piece 30 and the side wall piece 32 are preferably both made of injection molded plastic and may be fixedly attached together through any suitable means, e.g., adhesives. In the exemplary embodiment, the side wall piece 32 is transparent so that the pills 26 contained therein are visible when the main housing 24 is separated from the receptacle 22. In alternate embodiments, the receptacle 22 may take different forms.

Figure 3:
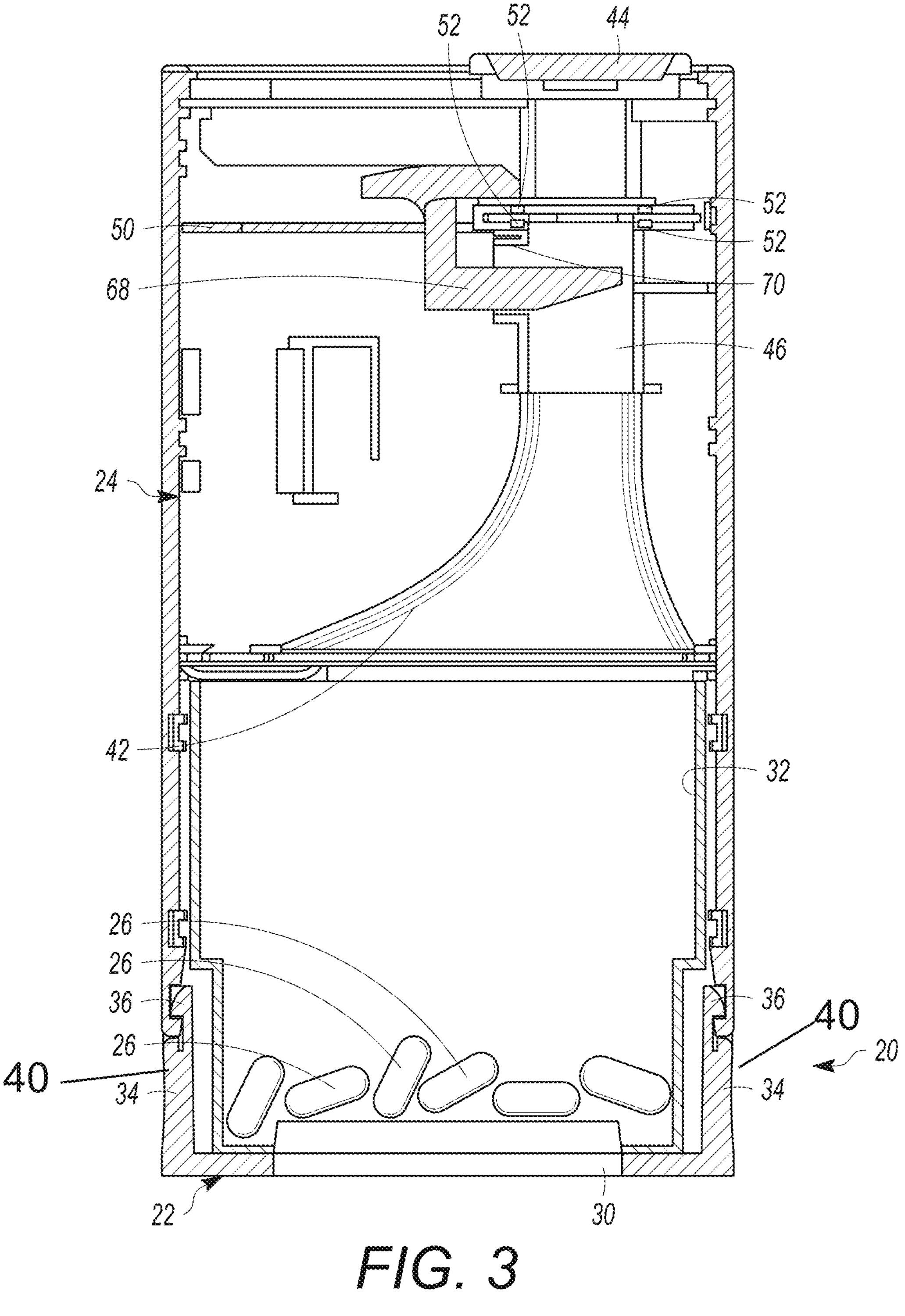
FIG. 3 is a cross-sectional view of the medication container of FIG. 1.
Figure 4:
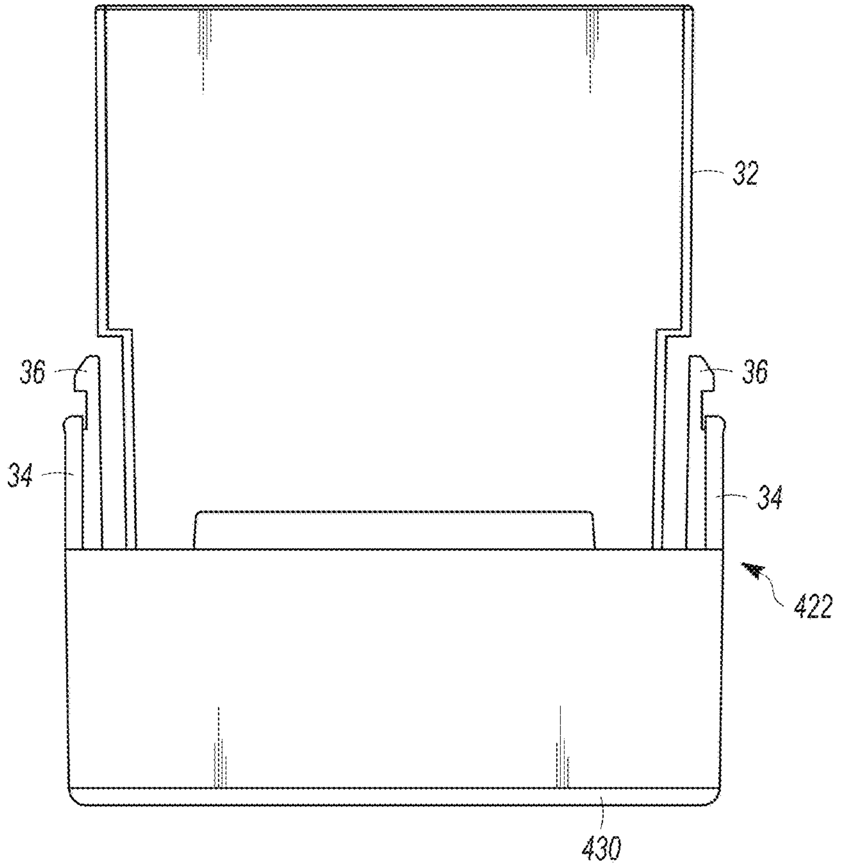
FIG. 4 is a cross-sectional view of an alternate embodiment of a receptacle that can be joined with a main housing of the medication container of FIG. 1.
Figure 5:
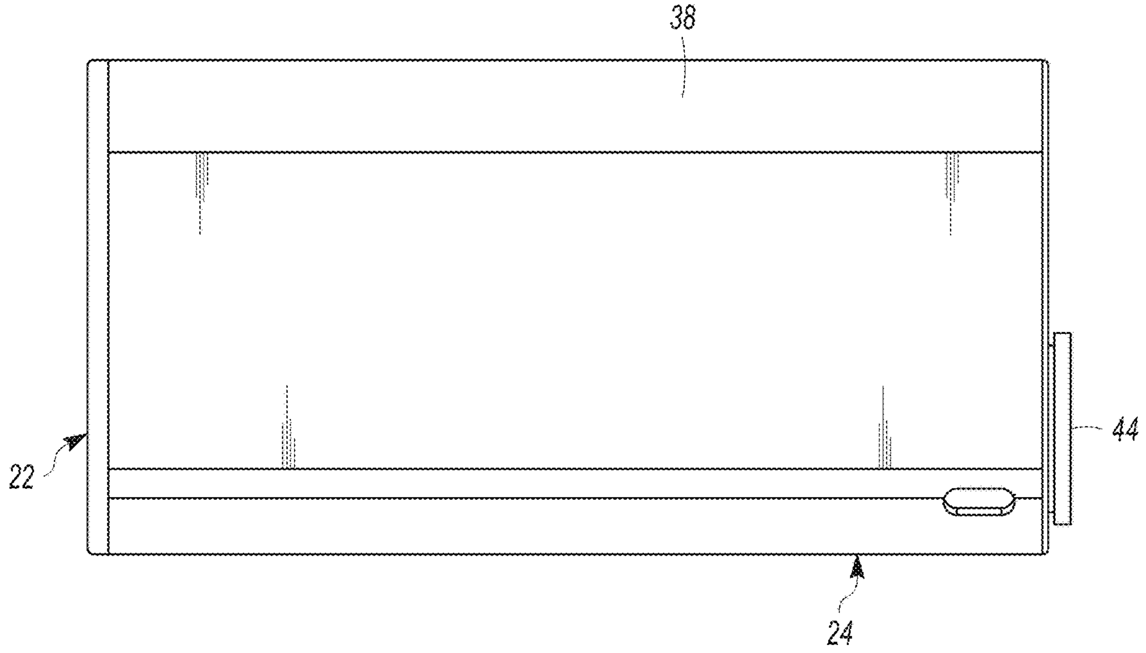
FIG. 5 is a front elevation view of the medication container of FIG. 1.
Figure 6:
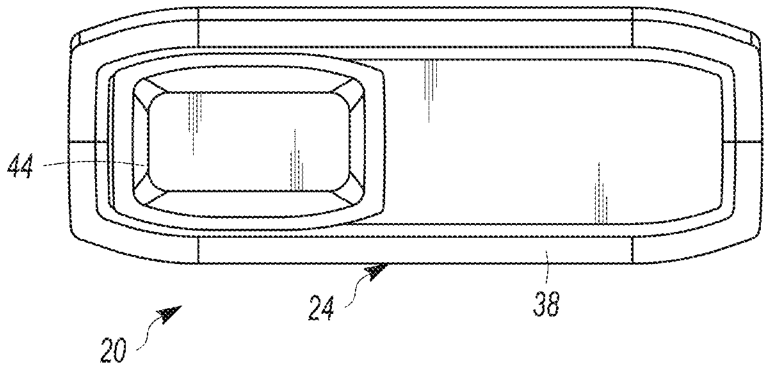
FIG. 6 is a top elevation view of the medication container of FIG. 1.
Figure 7:
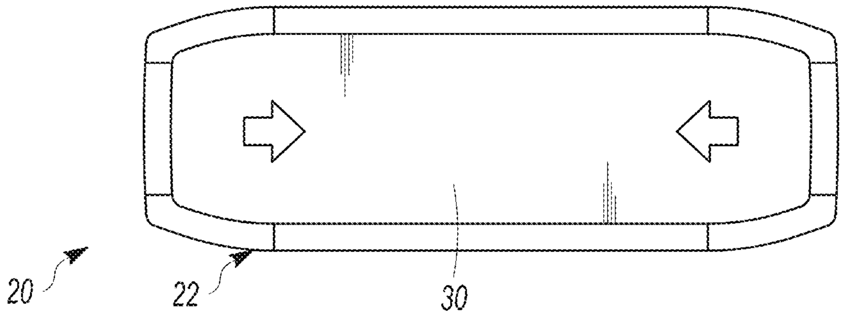
FIG. 7 is a bottom elevation view of the medication container of FIG. 1.

Turning now to FIGS. 3 and 4, the side wall piece 32 can be configured to mate with differently sized base pieces 30, 430, thereby allowing a volume of the inner space, or storage chamber, to be selected. For example, in the embodiment of FIG. 3, a first base 30 is attached with the side wall piece 32 to give the storage chamber a first volume, e.g., approximately fifty cubic-centimeters (50 cc). In the embodiment of FIG. 4, a larger, second base piece 430 is attached with the side wall piece 32 to give the storage chamber a second volume, e.g., approximately seventy cubic-centimeters (70 cc). The present system can be a kit with multiple base pieces (e.g., height of side wall pieces) to allow for an adjustable interior storage volume. The interior storage volume can be changes by changing the side wall piece for different sizes, numbers and volumes of pills to be stored therein.

Adjacent the base piece 30, each of the short side walls of the side wall piece 32 is recessed inwardly, and in this area, the base piece 30 includes a pair of upwardly extending (FIG. 3 orientation) fingers 34 that extend in parallel with the short side walls but are spaced from the short side walls by a gap. The fingers 34 are cantilevered from the closed base of the base piece 30. Each finger 34 includes an outwardly extending tab 36 adjacent its distal end that can be engaged in spring-like fashion within a recess of an outer wall of a housing 38 of the main housing 24 to establish the releasable connection between the receptacle 22 and the main housing 24. The base of each finger 34 has a button 40 that can be pressed inwardly to disengage the tab 36 of that finger 34 from the recess of the housing 38 of the main housing 24. By simultaneously pressing both buttons 40 inwardly and pulling the receptacle 22, the receptacle 22 can be disengaged from the main housing 24 to add pills 26 into the inner space, i.e., fill or refill the medication container 20. The receptacle 22 can then be re-engaged with the main housing 24 by inserting the side wall piece 32 of the receptacle 22 into the main housing 24 and pressing the receptacle 22 towards the main housing 24. Each tab 26 has a tapered upper surface, such that the fingers 34 automatically deflect inwardly as the tapered upper surfaces encounter a lower edge of the outer wall of the main housing 24. Upon alignment between the tabs 36 and the recesses in the main housing 24, the fingers 34 spring outwardly to once again lock the receptacle 22 with the main housing 24. In other words, by pushing the receptacle 22 into the main housing 24, these components automatically lock with each other via a snap-fitting engagement. This process of detaching and re-attaching the receptacle 22 and the main housing 24 is intuitive, simple, and repeatable, thereby allowing the user to refill the medication container 20 on their own or to change the medication within the medication container from one type to another. At least one environmental seal is preferably disposed on either the receptacle 22 or the housing 38 of the main housing 24 to environmentally seal these components together and retard the entry of moisture, light, and air into the inner space of the receptacle 22 and thereby protect the pills 26 contained therein.

The housing 38 of the main housing 24 is preferably made of one or more pieces of a durable plastic material that may be shaped through an injection molding operation. An outer surface of the housing may include indicia (such as a label) that identifies the type of pills 26 contained in the medication container 20 and dosing instructions. The label may also include instructions on how to use the main housing 24 and how to separate the main housing 24 from the receptacle 22 and re-attach them back together. The label can also include a machine-readable code for directing the user's electronic device to these instructions and to link the main housing 24 to the user's account.

As shown in FIG. 3, when the housing 38 of the main housing 24 is mated with the receptacle 22, the outer wall of the housing 38 surrounds and overlaps partially with the side walls of the receptacle 22 while leaving an outer surface of the base piece 30 exposed. The main housing 24 has a funnel-shaped inner wall 42 with a wide end that faces towards the inner space of the receptacle 22 and a narrow end that faces away from the receptacle 22 for guiding the pills 26 from the inner space towards an opening in the main housing 24 and out of the medication container 20. The opening of the main housing 24 is off-set from a central location of the main housing 24, and therefore, the funnel-shaped inner wall 42 is asymmetrical.

The opening can be selectively opened and closed by way of a slidable gate 44. Specifically, when the gate 44 is in the closed position (shown in FIG. 8), the user can open the gate 44 by pressing downwardly on a top surface of the gate 44 to disengage a locking mechanism and sliding the gate 44 from the closed position to an open position (shown in FIG. 9). When the gate 44 is in the open position, the pills 26 in the receptacle 22 can freely travel through a passage defined by the main housing 24 and out of the medication container 20 by inverting the medication container 20, thereby allowing the pills 26 to fall under the influence of gravity through the opening. On the other hand, when the gate 44 is in the closed position, the passage is closed and pills 26 cannot get into or out of the medication container 20. In an example embodiment, the gate 44 has a button, which projects above a top wall of the main housing 24 so that a user can manually engage the gate 44 and slide the gate 44 between the open and closed positions. The manual control of the gate 44 allows a user to still be able to access the pills 26, even in the event of a failure of the electrical components, which are discussed in further detail below, of main housing 24. In some embodiments, the gate 44 may be electronically, rather than manually, opened and closed. For example, an electrical motor or solenoid, powered from an electrical power source, can operate the gate 44 to move it from a closed position to an open position. In an example embodiment, the main housing 24 can include a touch sensing interface that can receive input through the interface and produce a control signal in the electronics to open and close the gate 44. The interface can be a display to provide machine to human interaction, e.g., displaying images of the items stored in the medication container 20, counts of items in the medication container 20 and the like.

Figure 12:
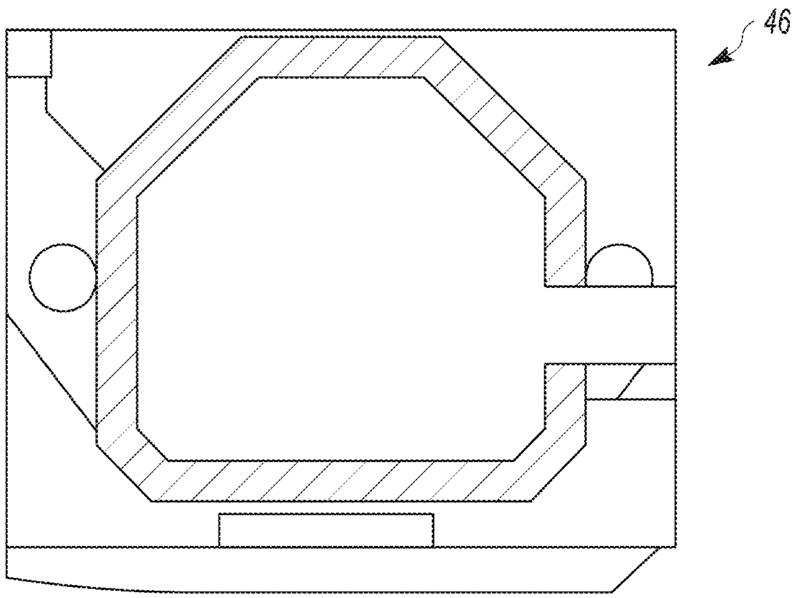
FIG. 12 is a top view of a singulator of the main housing.

In the exemplary embodiment, the funnel-shaped inner wall 42 feeds the pills 26 to a throat-section of the passage that is sized and shaped to only pass a single pill 26 at a time. Specifically, the funnel-shaped inner wall 42 guides the pills 26 to a singulator 46, which automatically singulates the pills 26 as they travel towards the opening so that only one pill 26 is dispensed out of the opening at a time. The singulator 46 refers to the structure described herein and shown in embodiments of the accompanying drawings that operates to dispense a single item, here described as pills. Turning now to FIG. 12, the singulator 26 of the exemplary embodiment has a wall structure that defines a through-passage in the shape of a non-symmetrical eight-sided polygon. That is, some of the sides of the shape of the through-passage have differing lengths and some of the angles between those sides are different around the shape of the through-passage. To ensure that only one pill 26 can pass travel in the through-passage at a time, the through-passage has a width, which extends between its furthest spaced-apart sides, that is both less than a major dimension of the pills 26 and is less than twice as wide as a minor dimension of the pills 26. Thus, to traverse the singulator 46, each pill 26 must be oriented with its major dimension extending vertically, and two pills 26 cannot traverse the singulator 46 side-by-side or otherwise become lodged in the singulator 46. In an example embodiment, the through-passage of the singulator 46 has a width of approximately 12.21 mm and a height of 11.48 mm. In some embodiments, a bump can be provided at a position within the funnel-shaped inner wall 42 to further singulate the pills 26 as the pills 26 approach the singulator 46 by precluding side-by-side passage of the pills 26 through the funnel area. The bump extends from the inner wall defining the passage in the singulator 46 into the passage through which the items, e.g., pills pass.

Figure 13:
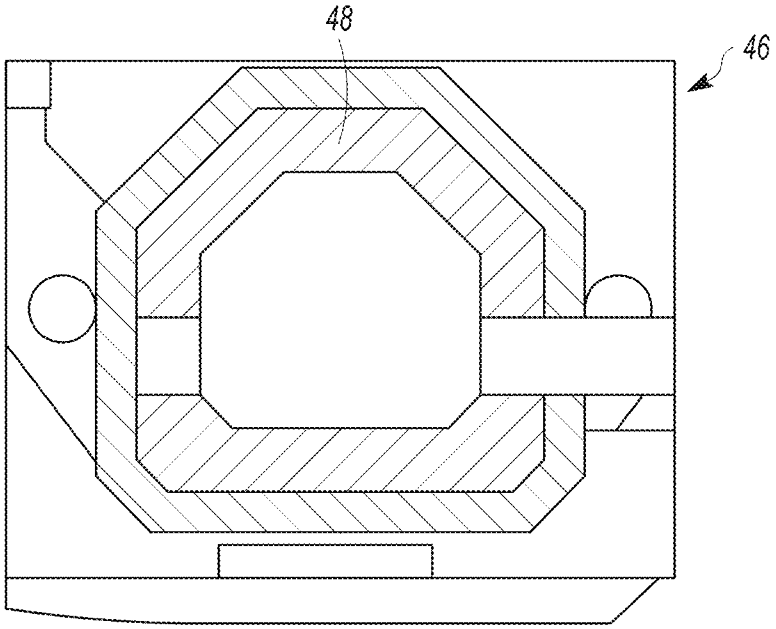
FIG. 13 is a top view of the singulator with an adapter disposed within a through-passage of the singulator.
Figure 14:
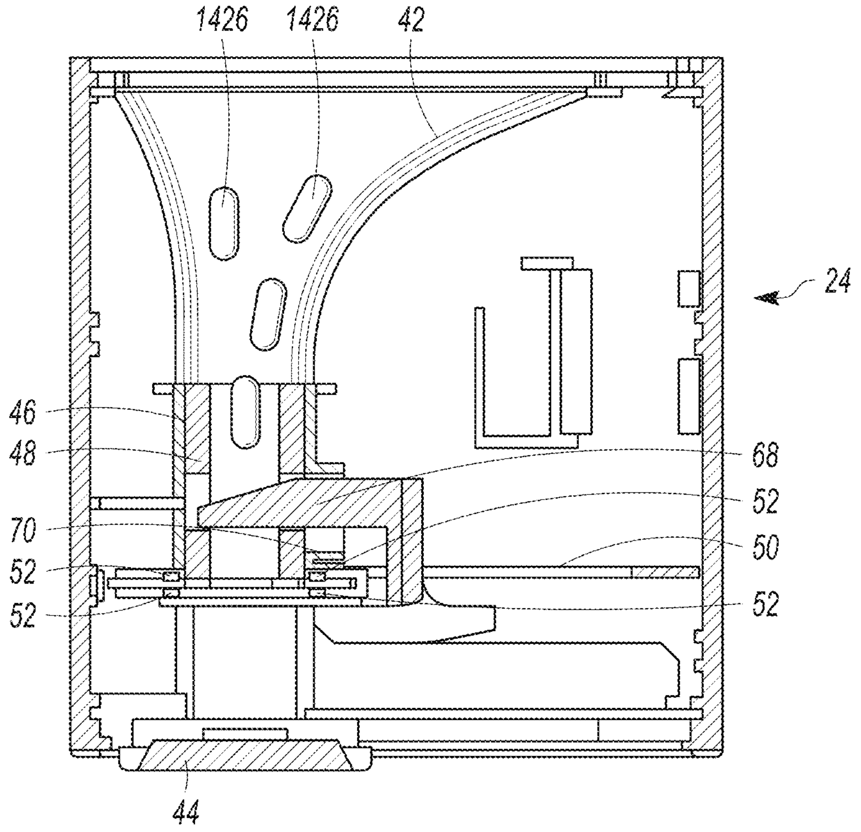
FIG. 14 is a cross-sectional view of the main housing with the adapter inserted in the singulator.

The medication container 20 may further include an adapter 48, or insert, which can be inserted into the singulator 46 to reduce the size of the through-passage to accommodate smaller or differently-shaped pills, such as pills 1426 of FIG. 14. An example of one such adapter 48 is shown in FIGS. 13 and 14. The asymmetrical shape of the through-passage of the singulator 46 and the corresponding shape of an outer wall of the adapter 48 ensures that the adapter 48 can only be inserted into the singulator 46 in a single, proper orientation, i.e., the adapter 48 cannot be inserted improperly. This feature makes it easier for the user to insert the adapter 48 into the singulator 46 when changing the medication that is contained within the medication container 20. Adapters of various sizes can be included to allow the medication container 20 to be used with pills 26 of differing sizes. In some embodiments, the adapters 48 of different sizes can be differentiated from one another by colors or other distinguishing features. For example, a red adapter 48 can be configured for use with medium-sized pills, and a blue adapter 48 can be configured for use with small-sized pills.

The main housing 24 further includes a plurality of electrical components for monitoring the passage of the pills 26 out of the medication container 20, for storing data pertaining to each dispensing operation, and for transferring that data to the external device 28. The electrical components include an electronics substrate, such as a printed circuit board (PCB) 50, that is disposed within a chamber of the main housing 24 outwardly of the funnel-shaped inner wall 42 such that the electronic components are isolated from the pills 26. In an example embodiment, the electronic components include a plurality of medication sensors 52 (in some embodiments, only a single medication sensor 52 may be included), an accelerometer 54, a wireless module 56, a processor (such as a microprocessor 58), a memory 60, a battery 62, a notification light 64, and a connection sensor 66. In one embodiment, the housing 38 may be opened to allow the battery 62 to be replaced when depleted. In some embodiments, the housing 38 may include a port for charging the battery 62 and/or for allowing non-wireless communication between the main housing 24 and the external device 28.

Figure 10:
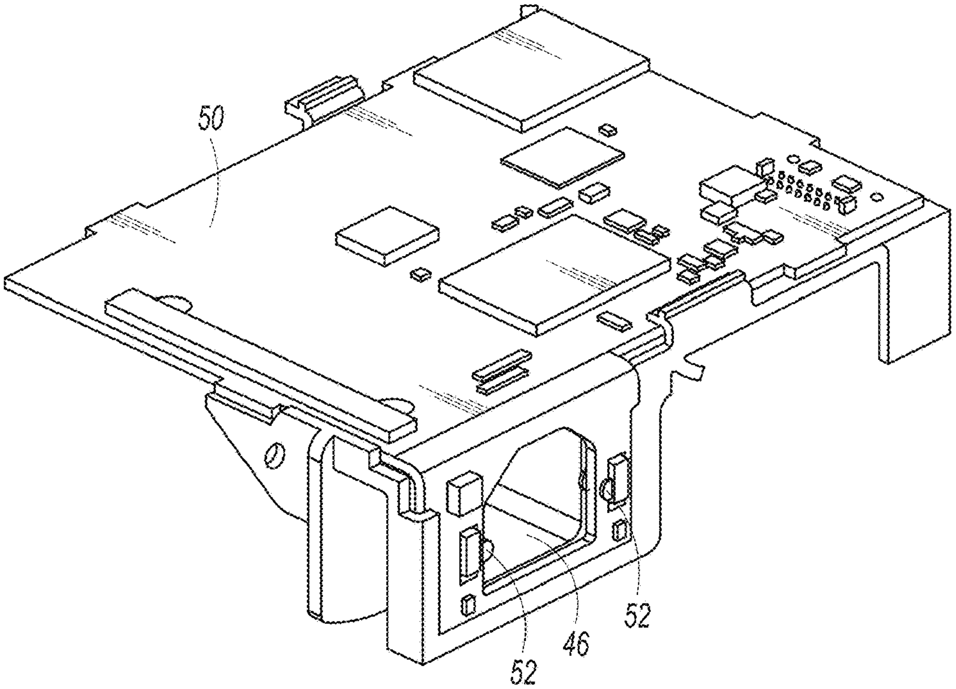
FIG. 10 is a perspective view of the electronic components of the main housing of FIGS. 8 and 9.

As shown in FIG. 10, in the exemplary embodiment, the PCB 50 includes a bend and a tab with an opening that surrounds the through-passage of the singulator 46. In this area, the at least one medication sensor 52 is positioned for detecting the movement of pills 26 within the through-passage in a contactless manner and transferring movement events to the microprocessor 58. In other words, the pills 26 do not have to touch the medication sensors 52 for the medication sensors 52 to be triggered and for the main housing 24 to register the event as a dispensing event. Thus, the medication sensors 52 do not include any moving parts that require contact from the pills 26 to detect dispensing. The medication sensors 52 can be item sensors to sense non-liquid items individually being dispensed from the medication container 20.

In one embodiment, each medication sensor 52 includes an emitter (for example, a light source) and a detector for detecting reflected light from the emitter. In the example embodiment, the emitter includes a light emitting diode (LED), which is configured to emit light in or near the infrared wavelength band. Specifically, the wavelength of light emitted from the emitter is greater than six-hundred and twenty-two nanometers (622 nm). However, other types of light sources that emit light with different wavelengths may alternately be employed. In an example embodiment, the medication sensors 52 can be sonic sensors. The medication sensors 52 may also include an array of emitters and aligned detectors. The array can be a one-by-many array, an N-by-N array, an N-by-M array (with N and M being different integers) or the like. The plurality of emitters and one or more detectors can be arranged in other patterns to match the periphery of the aperture through which the pills 26 pass. The plurality of emitters and one or more detectors can be arranged in an oval arrangement, a circular arrangement, or a polygonal arrangement (square or rectangular). The medication sensors 52 can be stacked in the direction of movement of the pills 26 within the through-passage to detect the direction of movement of an item and to differentiate pills 26 from other objects that might be inserted into the opening of the main housing 24.

As shown in FIG. 10, the emitter of each medication sensor 52 is directed to project light in a direction towards an opposite wall of the passage (such as through a lens or collimator). Each light detector can be a photodiode, which responds to a change in light, such as by generating a voltage or another signal, when light is projected in a surface of the photodiode. The light detector can communicate this voltage (or other signal) to the microprocessor 58, which can use this information to determine if a dispensing event occurred. Depending on the type of pills 26 (specifically, their color, reflectivity, and transparency) contained in the receptacle 22, the opposite wall of the passage may be white, black, reflective, or colored such that the light detectors generate a baseline voltage when the passage is empty.

Figure 16A:
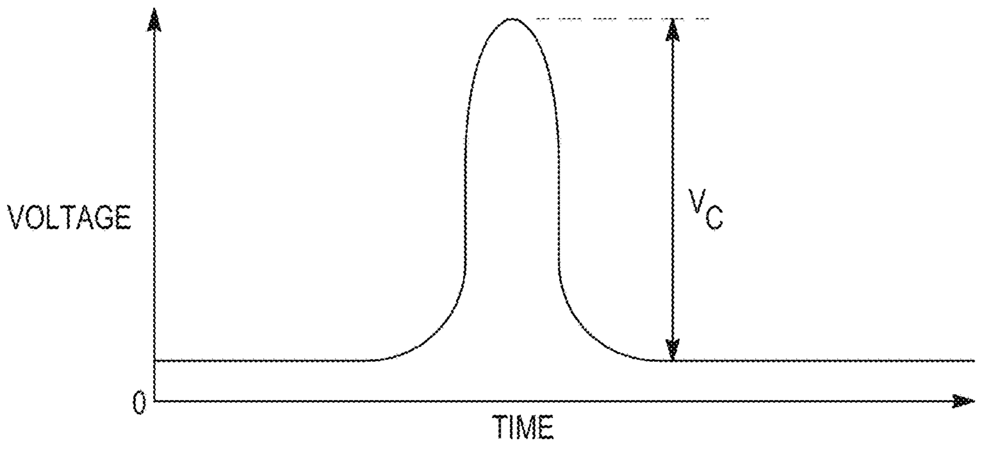
FIG. 16A is a plot showing the voltage produced by a light detector as a medication is dispensed therefrom.
Figure 16B:
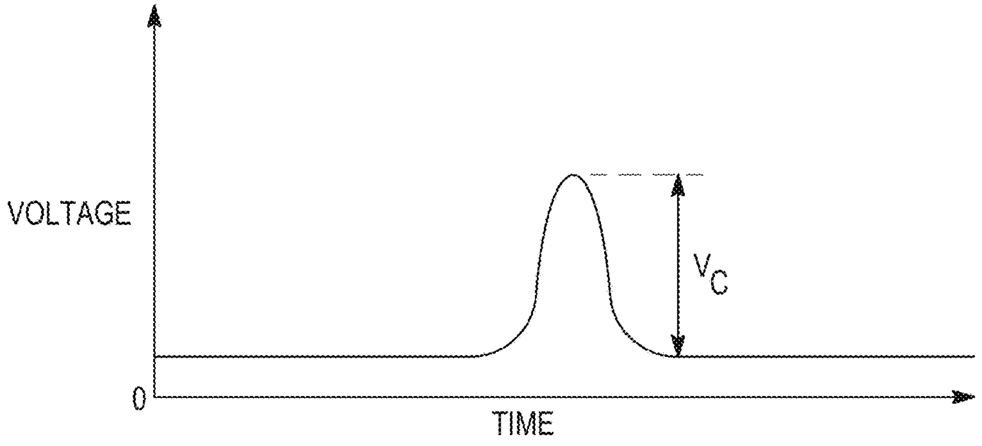
FIG. 16B is a plot showing the voltage produced by a light detector as a different medication is dispensed therefrom.
Figure 16C:
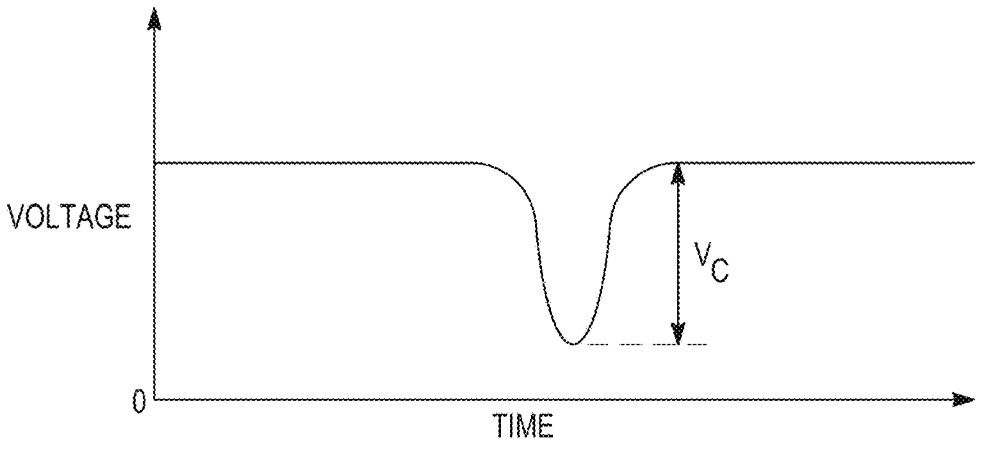
FIG. 16C is a plot showing the voltage produced by a light detector as a medication is dispensed therefrom according to a different embodiment.

In operation, when a pill 26 travels through the passage either into or out of the medication container 20, some of the light emitted by the emitter of one of the medication sensors 52 reflects off of the pill 26 and back to one of the light detectors, thereby changing the voltage produced by that light detector. In an example, there are multiple sensors along the path of pill travel that can sense pill movement toward a dispensing aperture. The magnitude of this voltage change $V_C$ will depend, inter alia, on the baseline voltage when the passage is empty and the color and reflectivity of the pill 26. The microprocessor 58 is pre-programmed to recognize the certain voltage changes $V_C$ as being associated with the pills 26 of the medication container 20 and to program into the memory data associated with each event in which that voltage change $V_C$ is detected. For example, FIG. 16A depicts the voltage output by a light detector wherein the opposite wall of the passage (shown in FIG. 9) has a reflective coating and wherein the pill 26 (also shown in FIG. 9) has a white color. The baseline signal of the light detector is set based on the ambient light that the sensor receives. In an example, the detector is recessed into wall and does not receive direct ambient light on the detector. There is some light that is received at the detector. For example, in this example, there is some white light that is being received at the detector. In an embodiment, the microprocessor 58 may be configured to recognize a voltage change $V_C$ of 325±25 mV as being associated with this pill 26. In another example, FIG. 16B depicts the voltage value output by the same light detector when a differently colored pill 26 passes through the same passage. The microprocessor 58 may be configured to recognize a voltage change $V_C$ of 250±25 mV as being associated with this type of pill 26. In other embodiments, the voltage change $V_C$ may be a negative value, i.e., the voltage at the light detector decreases when the pill 26 passes travels through the passage. For example, FIG. 16C depicts the voltage value output by the same light detector when a black colored pill 26 passes through the same passage. In this embodiment, the microprocessor 58 may be configured to recognize a voltage change $V_C$ of −175±25 mV as being associated with this type of pill 26. In either scenario where the voltage change $V_C$ is either positive or negative, the microprocessor 58 interprets such an event as a positive confirmation that a pill has passed into or out of the receptacle 22 (depending on an orientation of the medication container 20, as discussed in further detail below) and records the event into the memory 60.

The data that is saved into the memory 60 following a dispensing event preferably includes a time stamp and a quantity of pills 26 detected and dispensed out of the passage. Other data that may be saved into the memory 60 includes a temperature at the time of dispensing (if the main housing 24 further includes a temperature sensor) and remaining battery 62 capacity information. The fact that the main housing 24 only records a dispensing event when the correct voltage change $V_C$ is detected reduces false positives and improves accuracy of the data saved into the memory 60. The microprocessor 58 may also be configured to record data into the memory 60 when non-dispensing events occur, such as if the gate 44 is opened but no pill 26 is detected in the passage. In one embodiment, data is recorded onto the memory 60 each time the gate 44 is opened for more than a predetermined time threshold (such as two seconds).

In another embodiment, the medication sensors 52 are photoreflective diffuse sensors that are configured to sense a break in a path of light from the light source (also known as a sender or emitter) to the light detector (also known as a receiver). Specifically, in an example embodiment, a far wall of the passage opposite of the medication sensors 52 can be coated with a highly reflective coating such that, in a resting condition with the passage being empty, a beam of light emitted from the light source reflects off of the reflective coating and is sensed by a phototransistor of the light detector. In another example, the base line reading is the light reflecting off the opposite wall and returning to the light detector; the reflector is the uncoated polymer that forms the opposite wall. In this embodiment, the opposite wall can be a smoothed polymer. When a pill 26 travels through the passage either into or out of the medication container 20 through the opening, one or more of the medication sensors 52 are triggered by a breakage of the path of this beam of light. In an example embodiment, the medication sensor 52 can work by ambient light in the passage, e.g., detecting a change in the light sensed reflected in the passage without its own light source to illuminate the passage. Such an event with either of the medication sensors 52 is interpreted by the microprocessor 58 as a positive confirmation that a pill 26 has either passed into or out of the receptacle 22. The number of medication sensors 52 may be dictated by the sizes and shapes of the pills 26 that will be contained in the medication container 20 with more medication sensors 52 being preferred for smaller pills 26 to ensure that any pills 26 travelling through the passage break at least one of the light beams. The light beams emitted by the light sources may be in the infrared range such that the light beams are invisible to the human eye. In another embodiment, the medication sensors 52 are of the type that are capable of sensing the breakage of a beam of light from the light source without the need for the reflective coating on the far wall of the passage.

In yet another embodiment, the medication sensors 52 include imagers (for example, cameras), which are configured to capture image of the pills 26 traveling through the passage and communicate those images to the microprocessor 58. The microprocessor 58 can then automatically confirm that the pill 26 is the correct type of pill 26 by scanning the image for a size, shape, and color match and/or for an etching or other indicia on the pill 26. This improves medication compliance by positively confirming that each dispensing event recorded to the memory 60 is for the correct pill 26 and not an error. The image may be stored in the memory 60 of the main housing 24 and ultimately uploaded to the external device 28 via the wireless module 56, as discussed in further detail below.

In another example embodiment, the medication sensors 52 include signal emitters (in place of light sources), and the detectors can detect the signals. The signal emitters can emit an ultrasonic signal that is sensed by the detectors. In an example, the emitters are radio frequency (RF) emitters and the detectors detect change in the emitted signal. The associated circuitry can detect the presence of a pill 26 in the passage by a phase shift in the signal or a time shift in the signal received versus the signal emitted. The ultrasonic sensors are selected to have a wavelength that is disrupted when a solid item (such as a pill 26) passes the medication sensor 52. The ultrasonic sensors can be an array of sonic emitters and aligned sonic detectors to provide complete coverage of the passage that the item will take to exit the container. The sonic emitter and sonic detector can be arranged in a single unit, e.g., a transceiver. The array can be a one by many array, an N by N array, an M by N array (with N and M being different integers) or the like. The plurality of sonic sensors can be arranged in other patterns to match the periphery of the aperture through which the items, e.g., pills, pass. The sonic sensors can be arranged in an oval arrangement, a circular arrangement, or a polygonal arrangement (square or rectangular). The operational frequency range of the sonic sensors is selected to detect the particular item being dispensed. In the case of pharmaceuticals, e.g., pills, capsules and the like, the frequency range is selected (and controlled by processor circuitry) to identify the pills 26 passing the medication sensors 52. The multiple medication sensors 52 are positioned equidistant to each other to assist in detecting the shape of the item, e.g., height, width or both. In an example embodiment, the sonic sensors operate at different frequencies relative to at least one other sonic sensor. When using sonic sensors, the items lined up in the passage, e.g., singulated pills, can be sensed as the walls and in some examples, the items themselves, can at least semi-transparent when using sonic sensors. In an example, a sonic sensor detects one or more items in the passage and at least one light sensor detects passage of the item out of the medication container 20.

In an example embodiment, the medication sensors 52 can include detection circuitry to detect when a pill 26 passes into the passage. The detection circuitry can detect the change in light, sound source, RF signal, or the like to determine passing of one or more pills past the medication sensor in the passage.

In yet another example embodiment, each medication sensor 52 includes a camera and a light source, and the opposite wall of the passage has the at least one concave mirror. In operation, the light source projects light against the concave mirror, which reflects and focuses the light onto the camera. The camera takes images of any pills 26 travelling through the passage to detect those pills 26. The images captured by the camera can be analyzed by the microprocessor 58 to confirm that the medications contained therein are the correct pills 26.

In the exemplary embodiment, the gate 44 includes a restrictor arm 68 that is spaced on an opposite side of the medication sensors 52 from the opening of the main housing 24. The restrictor arm 68 may be generally L-shaped with a first leg that attaches with an upper portion of the gate 44 and a second leg that extends perpendicular to the direction of travel of the pills 26 through the passage. The restrictor arm 68 is either integrally formed with or otherwise fixedly attached to the upper portion of the gate 44 such that they move together between the closed and open positions illustrated in FIGS. 8 and 9 respectively. Because the restrictor arm 68 and the upper portion of the gate 44 are disposed on opposite sides of the medication sensors 52, when the gate 44 is in the closed position of FIG. 8, the pills 26 are restricted from accessing the area of the passage with the medication sensors 52. By restricting access of the pills 26 into the this area, a below-discussed calibration operation to establish the baseline voltages for the medication sensors 52 can be performed without the risk of any pills 26 interfering with the calibration operation. In some embodiments, the gap between the restrictor arm 68 and the upper portion of the gate 44 may be smaller than the major dimension of the pills 26 so that the pills 26 cannot get trapped in the gap between the restrictor arm 68 and the upper portion of the gate 44.

Figure 8:
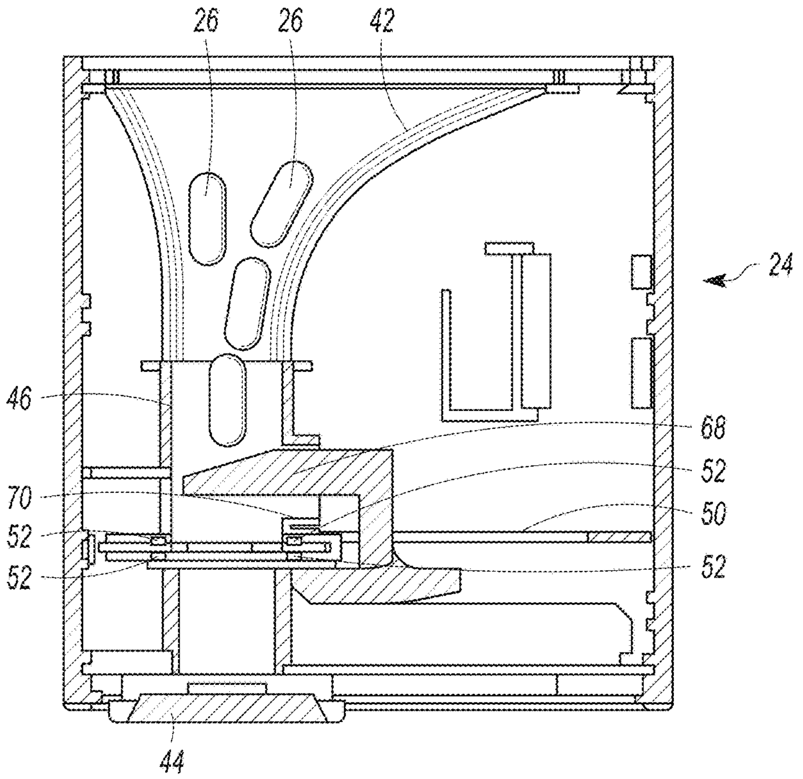
FIG. 8 is a cross-sectional view of a main housing of the medication container of FIG. 1 with a gate in a closed position.
Figure 9:
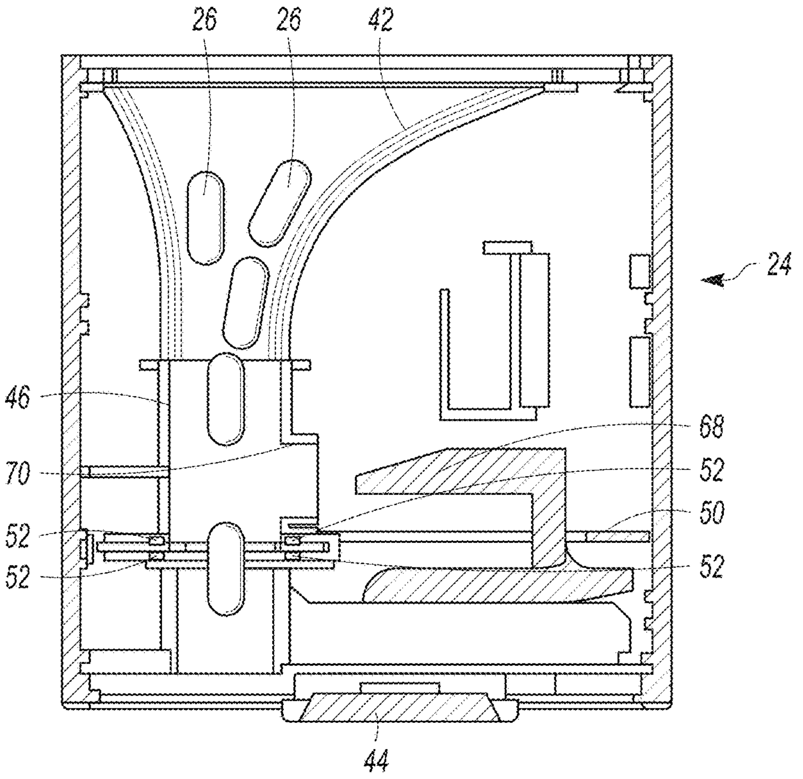
FIG. 9 is a cross-sectional view of the main housing of the medication container of FIG. 1 with a gate in an open position.

As shown in FIGS. 8 and 9, the singulator 46 has a transverse opening 70 that is shaped to receive the restrictor arm 68 so that the restrictor arm 68 can enter and close off the through-passage of the singulator 46 when the gate 44 is in the closed position. In other words, when the gate 44 is in the open position, the restrictor arm 68 is outside of the singulator 46, and when the restrictor arm 68 is in the closed position, the restrictor arm 68 extends not just into, but fully across the through-passage of the singulator 46.

Turning now to FIG. 14, the adapter 48 also includes at least one transverse opening that cooperates with the transverse opening 70 of the singulator 46 to allow the restrictor arm 68 to extend into and across the adapter 48. In the exemplary embodiment, the at least one transverse opening of the adapter 48 is a pair of aligned transverse openings such that the restrictor arm 68 can extend across both sides of the adapter 48 to the same locked position as when no adapter 48 is present in the singulator 46.

Figure 15:
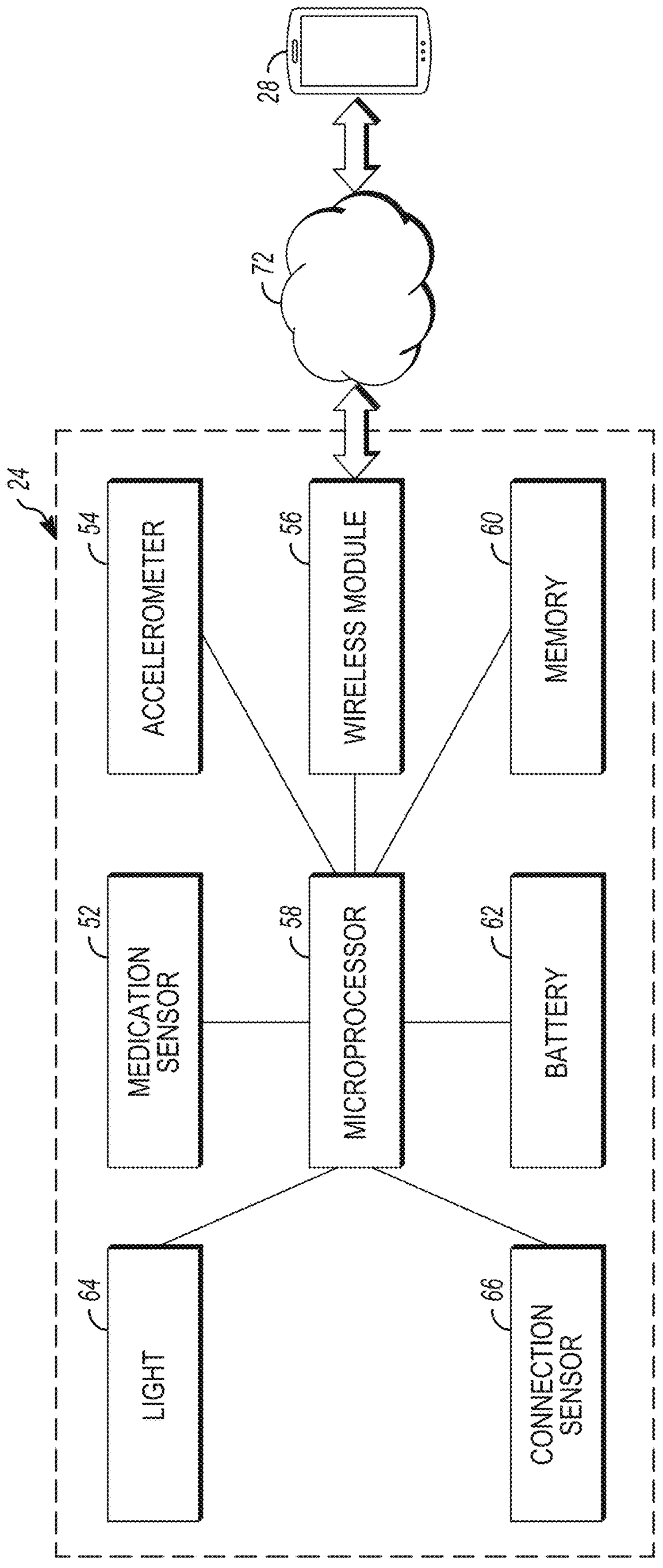
FIG. 15 is a schematic view of the main housing.

Referring now to the schematic view of FIG. 15 and the structure of FIGS. 1-9, the accelerometer 54 is in electrical communication with the microprocessor 58 and is configured to sense movement of the main housing 24, such as opening or closing of the gate 44 or a tilting of the medication container 20. In the first embodiment, the microprocessor 58 is configured to put the electrical components in the main housing 24 in a low power (sleep) mode after a predetermined time without the accelerometer 54 sensing movement, thus preserving power and extending battery life. For example, the microprocessor 58 could be configured to reduce or cut power to all of the electronic components in the main housing 24 except itself and the accelerometer 54 when the accelerometer 54 fails to sense any movement for a half-minute, one minute, two minutes, three minutes or the like. When the main housing 24 is in the low power mode, the microprocessor 58 is configured to immediately activate the electrical components in response to the accelerometer 54 detecting movement and providing an “ON” signal to the microprocessor 58.

In an embodiment, the accelerometer 54 also is configured to sense an orientation of the medication container 20 so that the microprocessor 58 can determine whether a trigger event by the medication sensors 52 is the travel of a pill 26 into or out of the receptacle 22. Specifically, if the accelerometer 54 senses that the medication container 20 is upside down or is angled downwardly at the time when one or more of the medication sensors 52 are triggered, then this indicates that a pill 26 has been poured out of the medication container 20, and the microprocessor 58 records the event in the memory 60 as a pill 26 leaving the receptacle 22. Conversely, if the accelerometer 54 senses that the medication container 20 is in an upright or an upwardly angled orientation at the time when one or more of the medication sensors 52 are triggered, then the microprocessor 58 records the event as a pill 26 being inserted into the receptacle 22.

The wireless module 56 is configured to transmit and receive data with the external device 28 (such as a smart phone, a tablet, a personal computer, a smart watch, a dedicated unit, server, or any suitable type of electronic device) either directly or via the internet 72. The wireless module 56 could be configured to communicate with the external device 28 via one or more of Bluetooth®, WiFi®, near field communications (NFC®), cellular communication, or any suitable wireless protocol or protocols. In an embodiment, the wireless module 56 is configured to communicate with the external device 28 via cellular communication channels, thereby eliminating the need for the user to pair or otherwise set up direct communication between the main housing 24 and the external device 28 and allowing the data to be uploaded to the external device 28 even when the external device 28 is not in the proximity of the main housing 24. Depending on the region, the wireless module 56 may be configured to communicate using Narrowband IoT and/or LTE-M technology. The external device 28 may also be a smart speaker that can allow a user to check if they have already taken their pill(s) 26 or which can remind the user when to take their pill(s) 26 according to the schedule. The external device 28 may further be or be in communication with a cloud accessible storage device that can store all of the data generated by the main housing 24 as a backup in the event that the main housing 24 is lost, damaged or malfunctions.

The wireless module 56 and the external device 28 can be configured to encrypt and verify all data communication therebetween, regardless of the form of wireless communication. The memory 60 can store at least the data that is to be transferred to the external device 28 so that this data is not lost if pills 26 are either added to or removed from the medication container 20 when the wireless module 56 is not in active communication with the external device 28. In other words, when the wireless module 56 is not actively in communication with the external device 28, the main housing 24 can operate as a stand-alone unit, which stores data internally until that data can be uploaded to the external device 28. The memory 60 may also contain data for an updatable medication count for the medication container 20. The medication count may be initially set by a pharmacy that fills the medication container 20 or may be set by the user who fills the medication container 20 themselves. The memory 60 is preferably of the non-volatile type such that the data stored thereon is not lost in the event of a power failure.

The battery 62 is mounted on the PCB 50 and is electrically connected with all of the electronic components to power these components. The battery 62 could be designed to be easily replaced to allow for re-use of the medication container 20, or the medication container 20 could be disposable such that it, along with the battery 62, is to be recycled after the pills 26 contained therein have been taken. In alternate embodiments, the main housing 24 could include a plurality of batteries and the battery 62 or batteries could be rechargeable via a recharging port on the main housing 24. The battery 62 or batteries may be provided with only enough charge (plus a safety factor) to last until the pills 26 that are initially placed in the receptacle 22 are to be either discontinued according to prescription instructions or run out. The battery 62 could be configured for wireless charging.

The main housing 24 itself (e.g., adherence device) and/or the external device 28 may be configured to monitor the medication count and alert a pharmacy to trigger an automatic refill when the medication count passes a predetermined threshold, e.g., four days of supply.

The main housing 24 and/or the external device 28 may also be configured to automatically alert a user when it is time for the user to take a dose of the pills 26. In some embodiments, a medication schedule is programmed into the memory 60, and the microprocessor 58 is configured to alert the user each time the user is to take a dose of the pills 26 according to the medication schedule. The medication schedule can be changed by a user and/or could be remotely changed by either the pharmacy or a doctor via the external device 28. The alert could be, for example, a notification displayed on or broadcast by the user's external device 28. In the exemplary embodiment, the main housing 24 itself further includes an alert means in the form of the notification light 64, which can visually alert the user. For example, the alert could be the notification light 64 changing colors or flashing at different rhythms. The notification light 64 may also communicate other messages to the user, such as when the battery 62 needs to be recharged or replaced.

As discussed above, the external device 28 and/or the memory 60 is/are programmed to maintain a continuously updated record of each positive confirmation of pill(s) 26 leaving or entering the medication container 20 through the opening and communicate that record when prompted by the user or a medical provider (such as a doctor). Thus, in the event that a user is unsure, the user can check the record to determine if the pill 26 was removed. The medical provider may then use the record to determine if the user is properly following a prescribed medication schedule. This improves medication adherence by eliminating doubt for both the user and the medical provider without the user having to take any additional steps, such as writing down the time each pill 26 was taken. The external device 28 may include an app that can also communicate with a remote, cloud-based database via internet protocols, which maintains a copy of the medication count and the records. The data may be periodically synced with the remote database either directly with the main housing 24 or via the external device 28. This advantageously allows the user, the medical provider, and/or a pharmacy to access the data from different devices and monitor the user's medication adherence, including whether the user is dispensing the pills 26 from the medication container 20. This also advantageously ensures that the data is not lost if the user loses or otherwise damages the main housing 24 or the external device 28.

The main housing 24 can be assembled separately from the receptacle 22 and is only joined with the receptacle 22 after the pills 22 have been inserted into the receptacle 22, for example, at a pharmacy. The memory 60 may be initially programmed to include data related to the pills 26 either before or after the main housing 24 is joined with the receptacle 22. In some embodiments, the medication container 20 can be provided to the user empty for the user to fill themselves.

Figure 11:
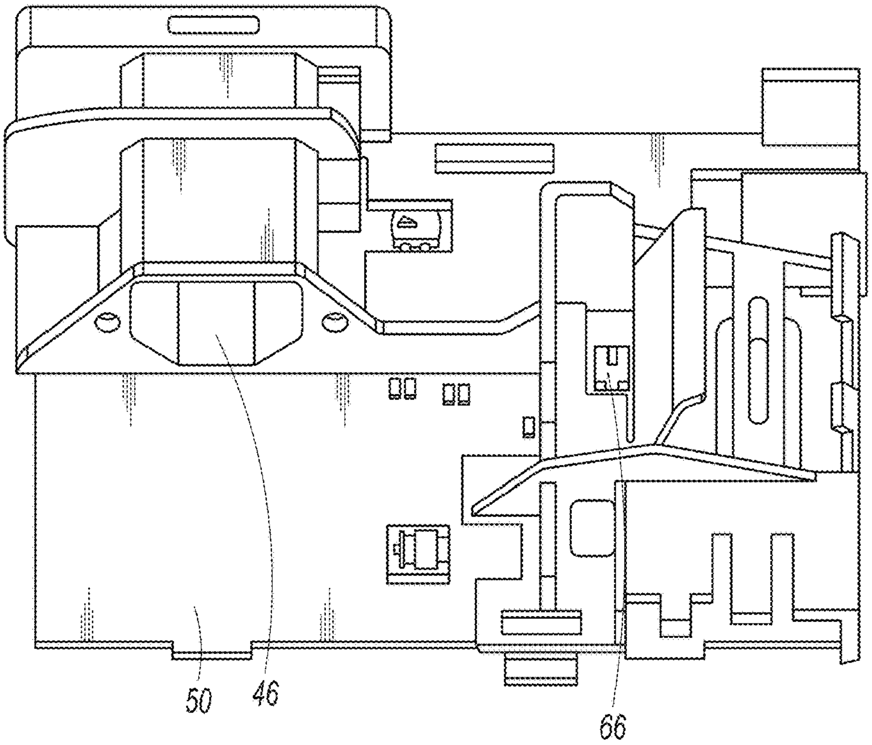
FIG. 11 is another perspective view of the electronic components of the main housing of FIGS. 8 and 9.

Referring now to FIG. 11, the connection sensor 66 (or attachment sensor) is disposed on the PCB 50 and is in electrical communication with the microprocessor 58 (shown schematically in FIG. 15). The connection sensor 66 is configured to be activated in response to a proper engagement between the receptacle 22 and the main housing 24. In the event that the connection sensor 66 detects that the main housing 24 has been detached from the receptacle 22, the microprocessor 58 logs this event in the memory 60 and/or uploads the event to the external device 28 to inform the user that the main housing 24 is not properly attached. This data can also be used to inform the user that the medication count the receptacle 22 may no longer be accurate due to the removal event. In some embodiments, the connection sensor 66 can activated in response to a physical engagement with the receptacle 22 or in response to proximity between the connection sensor 66 and a magnet or some other feature on the receptacle 22.

Figure 17:
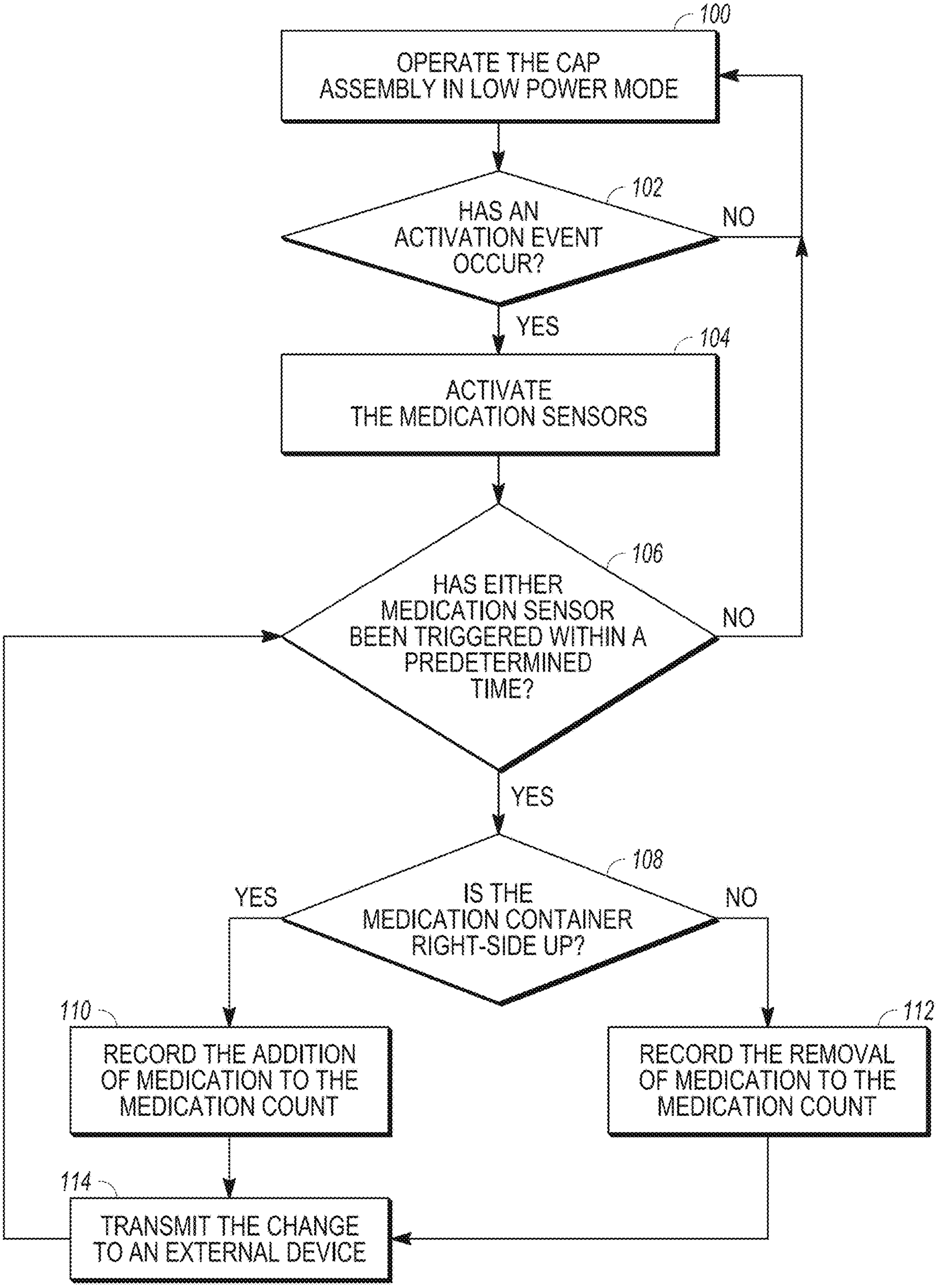
FIG. 17 is a flow chart depicting the steps of operating the medication container according to an exemplary embodiment.

Operation of an exemplary embodiment of the medication container 20 is discussed below with reference to the flow chart of FIG. 17. The method starts at step 100 with the main housing 24 operating in the low power mode whereby all of the electronic components, except the accelerometer 54 and the microprocessor 58, are deactivated. At decision step 102, the main housing 24 determines if an activation event has occurred, such as the accelerometer 54 sensing movement of the medication container 20 or the gate 44. If the answer to step 102 is no, then the method returns to step 100. If the answer to step 102 is yes, then the method proceeds to step 104. At step 104, the microprocessor 58 activates the medication sensors 52, the wireless module 56, and the memory 60. In another embodiment that has an on/off switch, all of the electrical components, including the microprocessor 58 and the accelerometer 54, could be off when the main housing 24 is in the low power mode and only activated when a switch is moved to the "on" position. In some embodiments, a different activation event, such as a detection by a gate sensor that the gate 44 has been opened, could awaken the previously powered down electrical components.

At decision step 106, the microprocessor 58 determines if one or more of the medication sensors 52 has been triggered within a predetermined period of time, e.g., one minute. If the answer at step 106 is no, then the method returns to step 100. If the answer to step 106 is yes, then the method proceeds to decision step 108. At decision step 108, the microprocessor 58, based on data from the accelerometer 54, determines if the medication container 20 is right-side up. If the answer at decision step 108 is yes, then the method proceeds to step 110. At step 110, the microprocessor 58 records the addition of pill(s) 26 to the medication count. If the answer at decision step 108 is no, then the method proceeds to step 112, then the microprocessor 58 records the removal of pill(s) 26 to the medication count. After either step 110 or 112, the method proceeds to step 114, and the change in the medication count is communicated via the wireless module 56 to the external device 28 or saved to the memory 60 for later uploading to the external device 28.

Systems and methods described herein can determine whether and/or when a patient is taking the prescribed pills 26. The main housing 24 or the external device 28 can provide, when appropriate, reminders and/or alerts to the patient or patient representative to improve adherence to a medication regimen.

In some embodiments, the medication container 20 includes an interface that can alert the user to environmental conditions that may compromise the integrity of the pills 26, e.g., temperature sensors determining that ambient temperature has exceeded a certain temperature, that a thermal budget has been used, or that the interior a chamber has exceeded a moisture level. The circuitry in the main housing 24 can electronically communicate with prescribing doctor's devices, pharmacy devices, insurance companies, pharmacy benefits management devices, and other parties that may be interested in prescription practices and adherence.

The external device 28 may further include an app or computer program that is configured to communicate with the main housing to allow the user to interact with the medication container 20. The app may be able to do any combination of the following functions: history tracking of medication events; provide reminders, such as through text messaging, E-mail, or through a phone call; provide caregiver support; select, download, and delete data; allow the user to provide feedback after each medication take; allow the user to request a refill; control a rewards program which gives the user rewards for following a medication schedule; and warn the patient when a medication schedule attempts to pair incompatible medications. Further, the app may work either when the external device 28 is or is not in communication with the medication container 20 and may allow the user to manually enter other medication taking events, such as if the medication container 20 is not working or such as for other medications than the pills 26 contained in the medication container 20. The app may further integrate with an existing electronic health records (HER) platform to automatically populate those records with a medication history. This may reduce the number of steps needed by both the patient and the providers to set up a medication adherence program and limit mistakes from patients who self-enter their medication. In one embodiment, the external device 28 may be configured to pair with the medication container by scanning a code (such as a quick response [QR] code) on the main housing 24.

Figure 18:
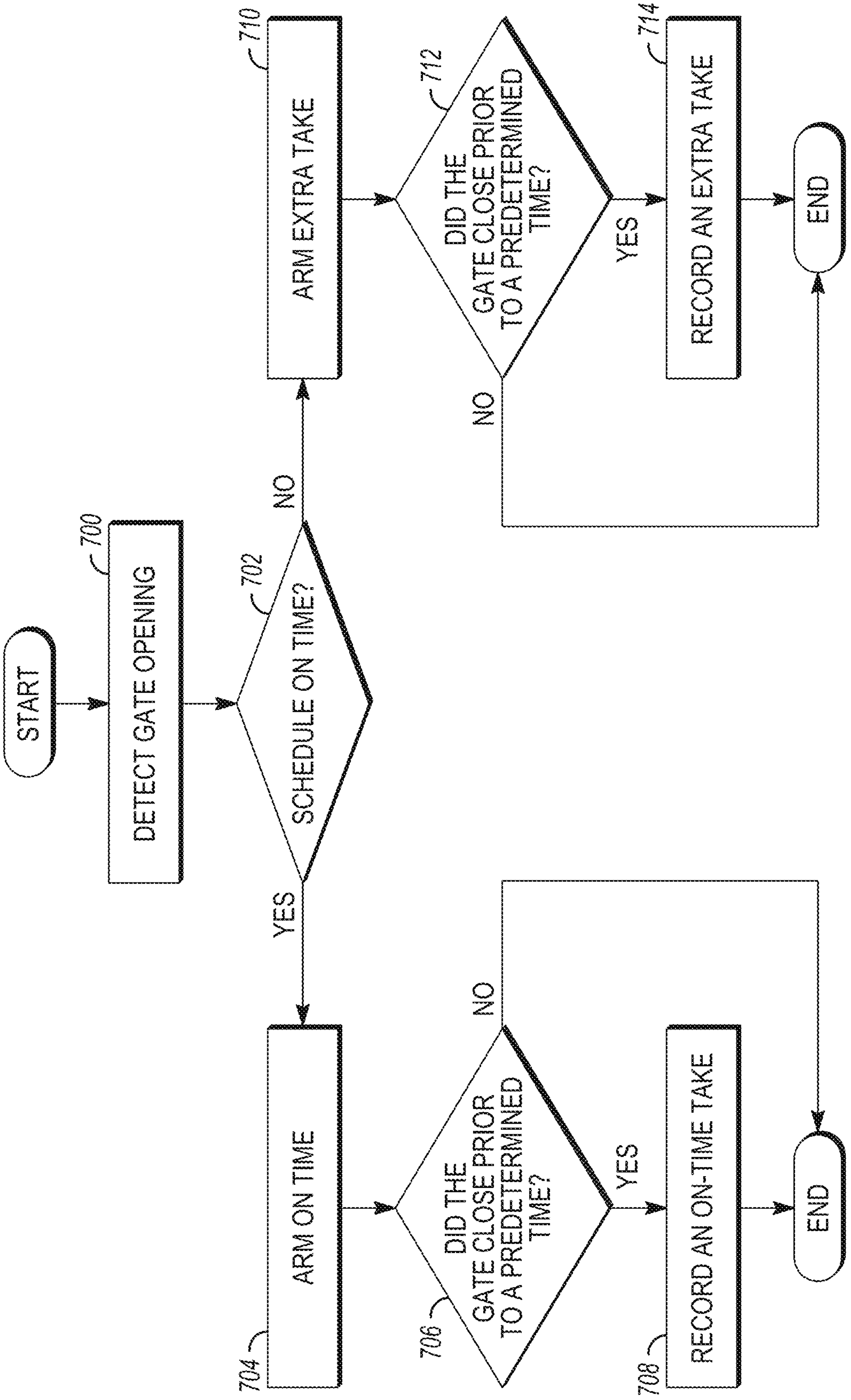
FIG. 18 is a flow chart depicting the steps of operating the medication container according to another exemplary embodiment.

FIG. 18 is another flow chart depicting the steps of a method of operating a medication container 20, such as the medication container 20 shown in FIGS. 1-14, is generally shown. At step 700, the main housing 24 detects a gate 44 opening (in other embodiments, it may be the accelerometer 54 detecting movement or some other activation trigger event). At decision step 702, the main housing 24 determines if the gate 44 opening event occurred within a predetermined time (for example, thirty minutes) of a scheduled medication dosage event.

If the answer at decision step 702 is yes, then the method proceeds to step 704, and the main housing 24 arms itself for an on-time dosage event. At decision step 706, the main housing 24 determines if the gate 44 closed prior to a very short, predetermined time period, such as one second or two seconds. If the answer at decision step 706 is yes, then at step 708, the main housing 24 records an on-time take to the memory 60, and then the main housing 24 goes into standby mode and awaits another gate opening event. If the answer at decision step 706 is no, then the main housing 24 goes into standby mode and awaits another gate 44 opening event.

If the answer at decision step 702 is no, then the method proceeds to step 710, and the main housing 24 arms itself for an extra take dosage event. At step 712, the main housing determines if the gate 44 closed prior to a very short predetermined time period, such as one second or two seconds. If the answer at step 712 is yes, then at step 714, the main housing 24 records an extra take event to the memory 60, and then the main housing 24 goes into standby mode and awaits another gate 44 opening event. If the answer at decision step 712 is no, then the main housing 24 goes into standby mode and awaits another gate 44 opening event. If the gate 44 opened outside the predetermined window set forth in step 702, but no dosage event occurred within that window, then the following dosage event may be marked as being scheduled rather than an extra take.

The schedule programmed into the memory 60 of the main housing 24 may be a single day schedule, a weekly schedule, or a monthly schedule. The main housing 24 may also be configured to operate without any schedule programmed therein. In this condition, any dosage event recorded to the memory 60 as being on time except if that dosage event occurs within a predetermined time (for example, one or two hours) of another dosage event. In that case, the second dosage event is recorded to the memory 60 as being an extra take.

Referring back to FIGS. 8 and 9, as discussed above, in the exemplary embodiment, the main housing 24 includes multiple medication sensors 52 that are configured to emit two vertically spaced apart beams of light across the passage. The medication sensors 52 are in electrical communication with the microprocessor 58 for communicating all events where the beams of light are broken to the microprocessor 58. In some embodiments, the beams of light can be spaced apart from one another by a distance that is greater than a major dimension of the pills 26 contained in the receptacle 22 such that a pill 26 can only encounter one of the two vertically spaced apart beams at a time. In such embodiments, if both of the beams of light are broken simultaneously, then the microprocessor 58 interprets this event as either multiple pills 26 being dispensed at the same time or something else (other than the pills 26) having been inserted into the passage. Thus, the microprocessor 58 may be able to differentiate a dispensing event from a false dispensing event, e.g., the user inserting their finger into the passage. If one of the beams of light is broken and then returned (unbroken) before the other beam is broken, then this event is interpreted by the microprocessor 58 as being either the dispensing of a pill 26 or a pill 26 being added into the medication container 20. Based on which of the beams of light is broken first, the microprocessor 58 can also determine which direction the pill 26 is travelling, i.e., into or out of the medication container 20. Specifically, with reference to the orientation of the medication container 20 in FIG. 8, if the lower light beam is broken first and then the upper beam of light is broken next, then the microprocessor 58 interprets this event as the addition of a pill 26 into the medication container 20. On the other hand, if the upper light beam is broken first and then the lower beam of light is broken next, then the microprocessor 58 interprets this event as the dispensing of a pill from the medication container 20.

Figure 19A:
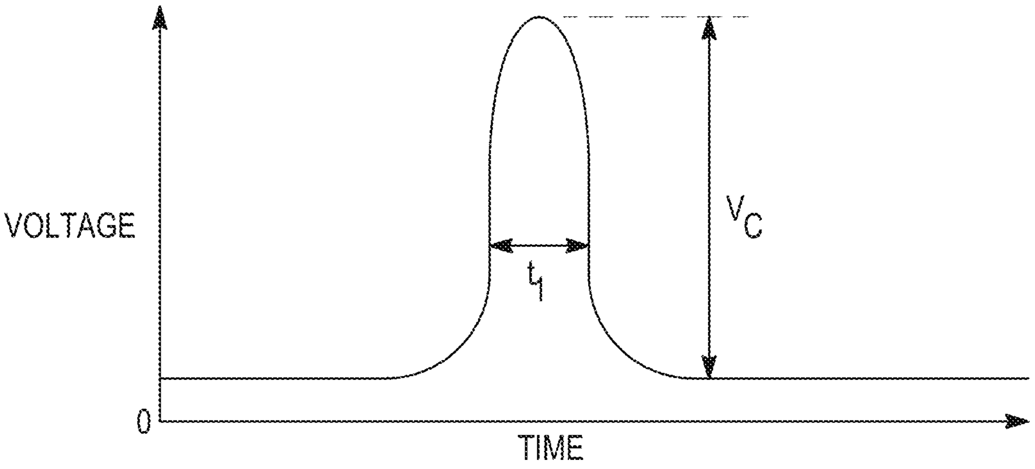
FIG. 19A is a plot showing the voltage produced by a light detector as a pill is dispensed therefrom.
Figure 19B:
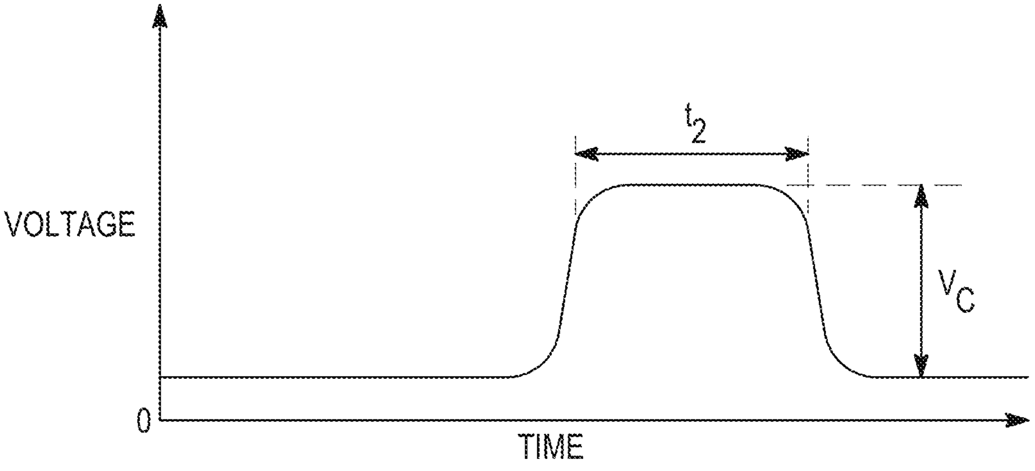
FIG. 19B is a plot showing the voltage produced by the light detector as a non-pill is inserted into the passage of the main housing.

FIGS. 19A and 19B show plots illustrating the voltage produced by a light detector of the medication sensor 52 in the main housing 24 as different events occur. In FIG. 19A, a pill 26 passes through the passage either into or out of the medication container 20. The time $t_1$ of the voltage spike $V_C$ is within a predetermined range, e.g., 0.5±0.1 seconds. In FIG. 19B, the time $t_2$ falls outside of the predetermined range, and therefore, the microprocessor 58 determines this event to not be a pill 26 addition or removal event. Such an event could be, for example, if a user inserts an object, like a finger, into the opening.

Referring still to FIGS. 19A and 19B, in some embodiments, the main housing 24 may periodically recalibrate itself to establish a new baseline voltage, i.e., the voltage produced by the light detector of the medication sensor 52 when the passage is empty. The recalibration process may be to improve performance of the main housing 24 because dust or other particles can settle on the light detector or a reflective surface on the opposite side of the passage from the light detector, thereby and impacting the amount of light that is emitted and/or received by the light detector when the passage is empty and altering the baseline voltage produced by the light detector. The calibration process includes activating the medication sensor 52 when the passage is empty (such as when the gate 44 is closed such that the restrictor arm 68 blocks pills from entering the area of the medication sensors 52) and measuring the voltage produced by the light detector. Once a generally constant voltage is measured for a predetermined period of time, (for example, two seconds) without any substantial voltage changes, such as voltage spike, this constant voltage is set as the new baseline voltage. The voltage change $V_C$ measurement used to determine if an object in the passage is a pill 26 or something else, does not have to be adjusted over time.

Figure 20:
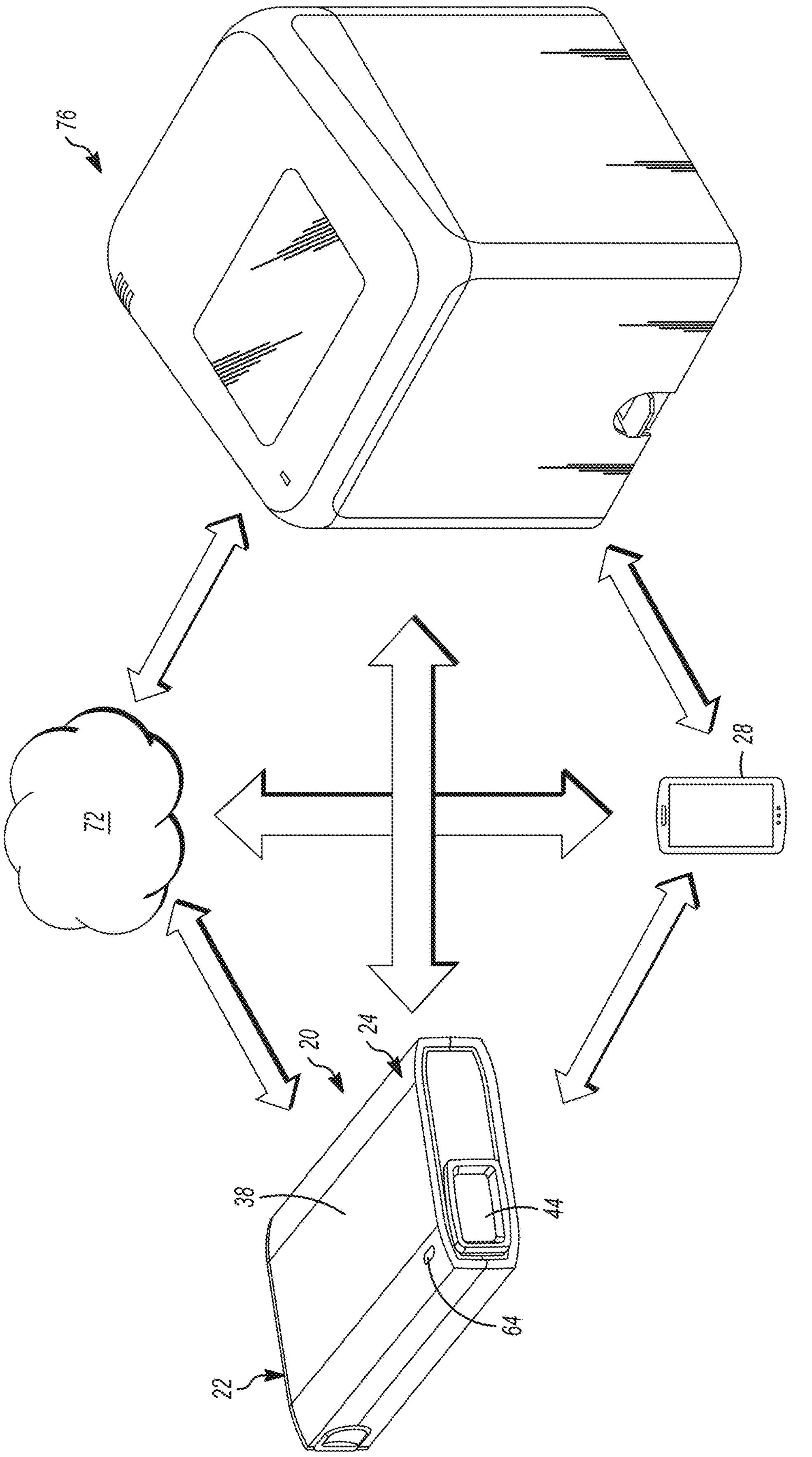
FIG. 20 is a schematic view illustrating an environment in which the medication container can operate.

Referring now to FIG. 20, the main housing 24 may be configured to communicate with a medication dispenser 76. Such a medication dispenser 76 can be a personal countertop device that contains one or more type of medication and is programmed to automatically dispense pills according to a programmed medication schedule or upon receiving a demand for one or more pills. If a user is going to be away from the medication dispenser for a period of time (for example, the user is leaving their house for one or more days), the user can dispense a sufficient quantity of pills to last for the time they are away from the medication dispenser 76 and insert those pills into the medication container 20. The medication dispenser 76 can then automatically communicate with the main housing 24 to program the user's medication schedule into the memory of the main housing 24 and/or to store a medication count of the pills dispensed by the medication dispenser 76 into the main housing 24. This communication could be direct, via the internet 72, or via the external device 28. Once programmed into the memory of the main housing 24, the main housing 24 can automatically alert the user (such as with the light) for each dosing event and can alert the user when a medication count in the medication container 20 falls below a predetermined threshold.

Both the medication dispenser 76 and the main housing 24 can communicate with a database that may be located, for example, on the external device 28 or on a cloud-based server and may be accessible by a third party (such as a medical care provider, a pharmacy, or a pharmacy benefit manager) to allow the user or the third party to monitor the user's medication adherence, whether the user is dispensing the pills from the medication dispenser 76 or the medication container 20. More specifically, either a dispensing event by the medication dispenser 76 or a dispensing event by the medication container 20 can be recorded to a database that can be accessed by various parties using various devices, including the external device 28.

In various embodiments, the medications can be non-liquid medications such as individualized dose medications, e.g., pharmaceuticals. The individual dose medications can be individually counted when they are dispensed from the receptacle past the medication sensor aligned with the passage. The medication, as in some embodiments, is a small, solid dosage form of a globular, ovoid, spheroid, or lenticular shape, containing one or more medical substances, supplemental substances, spices, or combinations thereof. The container and the cap are adapted to store these forms and prevent entry of environment into the interior of the medication container when closed by the main housing. The medication container is adapted to hold a plurality of the forms, e.g., ten, twenty, thirty, sixty, ninety, or multiples thereof Some of the embodiments described herein are described with light sensors, however, sonic sensors can be used in these embodiments. The sonic sensors sense reflected sound pulse and detects the echo. The sonic sensors may detect the orientation of one or more items in the passage. The sonic sensors may be more insensitive to hindering factors, e.g., dust, smoke, ambient light, vapor, lint, or the like. In an example embodiment, sonic sensors and light sensors are used together and will produce different detection signals which can be combined to detect the item traveling through the exit passage of the container.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications. For example, the present disclosure uses pills as the example of items to be stored, counted and dispensed from the container. However, some embodiments may be used with multiples of items that are non-liquid, solid exterior, items that a dispensed from a mobile container.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations of the systems, algorithms, methods, instructions, etc., described herein may be realized in hardware, software, or any combination thereof. The hardware may include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably.

As used herein, the term module may include a packaged functional hardware unit designed for use with other components, a set of instructions executable by a controller (e.g., a processor executing software or firmware), processing circuitry configured to perform a particular function, and a self-contained hardware or software component that interfaces with a larger system. For example, a module may include an application specific integrated circuit (ASIC), a Field Programmable Gate Array (FPGA), a circuit, digital logic circuit, an analog circuit, a combination of discrete circuits, gates, and other types of hardware or combination thereof. In other embodiments, a module may include memory that stores instructions executable by a controller to implement a feature of the module.

Further, in one aspect, for example, systems described herein may be implemented using a special purpose computer/processor may be utilized which may contain hardware for carrying out any of the methods, algorithms, or instructions described herein. The hardware may become a special purpose device when storing instructions, loading instructions, or executing instructions for the methods and/or algorithms described herein.

Further, all or a portion of implementations of the present disclosure may take the form of a computer program product accessible from, for example, a computer-usable or computer-readable medium. The program includes steps to perform, at least, portions of the methods described herein. A computer-usable or computer-readable medium may be any device that can, for example, tangibly contain, store, communicate, or transport the program for use by or in connection with any processor. The medium may be, for example, an electronic, magnetic, optical, electromagnetic, or a semiconductor device. Other suitable mediums are also available.

The above-described embodiments, implementations, and aspects have been described in order to allow easy understanding of the present disclosure and do not limit the present disclosure. On the contrary, the disclosure is intended to cover various modifications and equivalent arrangements included within the scope of the appended claims, which scope is to be accorded the broadest interpretation to encompass all such modifications and equivalent structure as is permitted under law.

What is claimed is:

1. A medication container, comprising a receptacle having an inner space for holding medications;

a main housing coupled with the receptacle for retaining the medications in the inner space;

the main housing having an opening and a movable gate that can selectively open and close the opening;

a singulator located between the inner space of the receptacle and the opening and being shaped to only allow a single medication to pass through the singulator to the opening at a time;

at least one first medication sensor, including an emitter and a detector, positioned adjacent the singulator and at least one second medication sensor, the at least one first medication sensor and the at least one second medication sensor being configured to sense pills passing through the through-passage of the singulator both into and out of the receptacle, wherein the at least one second medication sensor is located in said main housing between restrictor arm of said gate and said upper portion of said gate, the at least one second medication sensor being configured to detect movement of the pills from the receptacle to the opening of the main housing, wherein the at least one first medication sensor is located at the through-passage between the restrictor arm of said gate and the opening;

a processor in electrical communication with the at least one first medication sensor, the at least one second medication sensor and with a memory and with a wireless module, the processor being configured to process data pertaining to passage of a pill through the through-passage in either direction relative to the inner space of the receptacle and to transmit the data to an external device; and the main housing further having a generally funnel-shaped inner wall that extends a wide end adjacent the inner space of the receptacle to a narrow end adjacent the singulator for guiding the medications towards the singulator during a dispensing operation.

2. The medication container as set forth in claim 1 further including an adapter that is received within the singulator and which is configured to reduce a maximum size of medication that can pass through the singulator towards the opening of the main housing.

3. The medication container as set forth in claim 2 wherein the singulator has a through-passage with a non-circular shape.

4. The medication container as set forth in claim 3 wherein the adapter has an outer periphery that generally matches the non-circular shape of the through-passage of the singulator so that that the adapter can only be inserted into the through-passage of the singulator in one orientation.

5. The medication container as set forth in claim 1 wherein the gate has an upper portion that is disposed at least partially outside of a housing of the main housing and has a restrictor arm that is located fully within the housing spaced from the upper portion of a cap, the restrictor arm being configured to extend into the singulator when the gate is in a closed position to prevent the movement of medications through the singulator when the gate is in the closed position.

6. The medication container as set forth in claim 5 wherein the at least one first medication sensor and the at least one second medication sensor are both located in said main housing between said restrictor arm of said gate and said upper portion of said gate, the at least one medication sensor being configured to detect movement of the medications from the receptacle to the opening of the main housing.

7. The medication container as set forth in claim 1 wherein the at least one second medication sensor includes a light emitter and a light detector.

8. The medication container as set forth in claim 1 further including an adapter that is received within the singulator and wherein the adapter has a pair of apertures that are aligned with one another and wherein the restrictor arm extends into both of the apertures of the adapter when the gate is in the closed position.

9. The medication container as set forth in claim 1 wherein the receptacle has a pair of fingers that have tabs which can be received within openings in a housing of the main housing to lockingly engage the receptacle with the main housing and wherein the fingers can be deflected to disengage the receptacle from the main housing.

10. The medication container as set forth in claim 1 wherein the main housing is configured to detect the movement of the medications into and out of the receptacle through the opening and to transmit data related to this movement of the medications to an external device.

11. A method of making a medication container, comprising the steps of:

inserting a singulator into a housing of a main housing, the housing further including a funnel-shaped inner wall that extends from a wide end to a narrow end adjacent the singulator, and the singulator having a through-passage that is shaped to only allow a single medication to pass through the singulator at a time, and the housing having an opening on an opposite side of the singulator from the funnel-shaped inner wall;

inserting a plurality of medications into an inner space of a receptacle;

releasably joining the main housing with the receptacle;

joining a gate connected to an external actuator with the housing of the main housing with the gate including a restrictor arm upstream from the opening, the gate being selectably movable between an open position whereby the medications can freely flow through the opening of the housing of the main housing into and out of the receptacle and a closed position whereby the medications are trapped inside of the receptacle and with the actuator being outside the housing aligned with the narrow end in the closed position and laterally positioned from the narrow end in the open position; and connecting a first sensor and a second sensor adjacent the gate and at the through passage to detect the movement of the medication in two directions in the through passage with the first sensor located between the restrictor arm of the gate and the opening and the second sensor is located in the housing between the restrictor arm of said gate and an upper portion of said gate.

12. The method as set forth in claim 11 wherein the gate has a restrictor arm and further including the step of moving the gate into the closed position whereby the restrictor arm extends into and across the through-passage of the singulator.

13. The method as set forth in claim 11 further including the step of inserting an adapter into the through-passage of the singulator to reduce a maximum pill size that can pass through the singulator from the inner space of the receptacle to the opening of the housing of the main housing.

14. The method as set forth in claim 11 further including the step of inserting a processor and a memory and a wireless module into the main housing so that the main housing can transmit data pertaining to the passage of medications through the singulator to an external device.

15. A medication container, comprising a receptacle having an inner space for holding pills and having a pair of deflectable fingers on opposite sides of the receptacle, each of the fingers having an outwardly extending tab;

a main housing including a housing that is releasably engaged with the deflectable fingers;

a singulator positioned in the housing and having a non-circular through-passage that is sized and shaped to only pass a single pill through the singulator at a time;

the housing having a funnel-shaped inner wall with a wide end adjacent the receptacle and a narrow end adjacent the singulator for guiding the pills to the singulator, and the housing having an opening on an opposite side of the singulator from the receptacle;

at least one first medication sensor, including an emitter and a detector, positioned adjacent the singulator and configured to sense pills passing through the through-passage of the singulator;

at least one second medication sensor, including an emitter and a detector, positioned adjacent the singulator and spaced from the at least one first medication sensor, the at least one second medication sensor configured to sense pills passing through the through-passage of the singulator;

a processor in electrical communication with the at least one first medication sensor, the at least one second medication sensor and with a memory and with a wireless module, the processor being configured to process data pertaining to each passage of a pill through the through-passage in a first direction away from the receptacle and a second direction toward the receptacle, and to transmit the data to an external device; and a gate that is movable between a closed position and an open position to selectively open and close the opening, wherein the gate has an upper portion that is disposed at least partially outside of a housing of the main housing and has a restrictor arm that is located fully within the housing spaced from the upper portion of the cap and downstream from the first sensor, the restrictor arm being configured to extend into the singulator when the gate is in a closed position to prevent the movement of medications through the singulator when the gate is in the closed position, and wherein the second sensor is between the upper portion and the restrictor arm.

16. The medication container as set forth in claim 15 further including an adapter that is received within the through-passage of the singulator and which is configured to reduce a maximum size of medication that can pass through the singulator towards the opening of the main housing.

17. The medication container as set forth in claim 16 wherein the adapter has an outer periphery that generally matches the non-circular shape of the through- passage of the singulator so that that the adapter can only be inserted into the through-passage of the singulator in one orientation.

* * * * *